(12) United States Patent
Howard

(10) Patent No.: US 11,762,915 B2
(45) Date of Patent: Sep. 19, 2023

(54) MULTI-MODAL VIRTUAL EXPERIENCES OF DISTRIBUTED CONTENT

(71) Applicant: VIRTUAL ALBUM TECHNOLOGIES LLC, Hobe Sound, FL (US)

(72) Inventor: Todd A Howard, Hobe Sound, FL (US)

(73) Assignee: VIRTUAL ALBUM TECHNOLOGIES LLC, Hobe Sound, FL (US)

(*) Notice: Subject to any disclaimer, the term of this patent is extended or adjusted under 35 U.S.C. 154(b) by 386 days.

(21) Appl. No.: 15/734,664

(22) PCT Filed: Jun. 22, 2018

(86) PCT No.: PCT/US2018/038961
§ 371 (c)(1),
(2) Date: Dec. 3, 2020

(87) PCT Pub. No.: WO2019/245578
PCT Pub. Date: Dec. 26, 2019

(65) Prior Publication Data
US 2021/0232632 A1    Jul. 29, 2021

(51) Int. Cl.
```
G06F 16/00      (2019.01)
G06F 16/9035    (2019.01)
H04N 13/395     (2018.01)
G06F 16/9038    (2019.01)
G06F 16/21      (2019.01)
G02B 30/52      (2020.01)
```
(Continued)

(52) U.S. Cl.
CPC ....... *G06F 16/9035* (2019.01); *G02B 30/52* (2020.01); *G06F 3/011* (2013.01); *G06F 3/017* (2013.01); *G06F 16/211* (2019.01); *G06F 16/9038* (2019.01); *G06N 3/08* (2013.01); *H04N 13/395* (2018.05); *G06F 2203/011* (2013.01)

(58) Field of Classification Search
CPC ................................................. G06F 16/9035
See application file for complete search history.

(56) References Cited

U.S. PATENT DOCUMENTS

2015/0006492 A1* 1/2015 Wexler .................. G06F 16/248
707/694

* cited by examiner

*Primary Examiner* — Ajith Jacob
(74) *Attorney, Agent, or Firm* — LABYRINTH LAW PLLC; Kevin L. Miller

(57) ABSTRACT

Systems and techniques are described herein for providing a beholder, via a user interface on a user experience device, with a multi-faceted and flexibly-dimensional virtual experience of one or more target identities placed in a subject matter context. A systems aspects include selecting, finding, and interpreting digital content pertaining to a subject matter context indicated by the beholder; deconstructing digital content into discrete content elements containing content segments that are classified according to a schema of element facets, and then constructing a facet-segmented repository of discrete content elements pertaining to a target identity; supplementing existing digital content with supplemental information and content to support the presentation of expanded information content, dimensions, or sensory capabilities; and creating and presenting a virtual experience container that is adapted to the beholder and the capabilities of the beholders user experience device.

14 Claims, 10 Drawing Sheets

(51) Int. Cl.
*G06F 3/01* (2006.01)
*G06N 3/08* (2023.01)

MULTI-MODAL VIRTUAL EXPERIENCES OF DISTRIBUTED CONTENT

BACKGROUND

The volume of digital content about our movements, activities, experiences, thoughts, feelings, and relationships has grown at an exponentially-expanding rate in recent years. Devices with new form factors, such as mobile phones and other devices, have made it trivially easy for users record content, and most users have amassed huge accumulations of digital images, photographs, videos, music, and original and scanned digital documents strewn across a labyrinth of local device file storage and cloud-based online storage accounts, not to mention email, text, blog entries, forum postings, and purchase and other online transactions across a vast assortment of systems. Meanwhile, a proliferation of competing online social networks (OSNs) have arisen that make it trivially easy to share content, thoughts, commentary, and opinions with others.

BRIEF SUMMARY

Despite the availability of content, methods of finding and navigating content so that it can be formed into a content-rich and coherent view of a person, topic, event, life experience, memoir, or entire life biography have been lacking. Existing methods are painstakingly cultivated and single dimensional in the experience they provide. Existing OSN content navigation tools, for example, provide a "timeline" view of uploaded content that functions, essentially, as a time-sorted list that lacks (among many other defects): topical context, an ability to adjust the time viewpoint's granularity, the ability to supplement poor quality content and/or expand the sensory or dimensional range of that content to suit different presentation devices, and the ability to tailor content navigation to the specific needs of various individual beholders.

In view of these and other defects and limitations in the existing methods, systems and techniques are described herein for providing a beholder, via a user experience device, with a multi-faceted and flexibly-dimensional virtual experience of one or more target identities placed in a subject matter context. Such virtual experiences are derived, at least in part, from the digital content of the target identities and supplemented by digital content from other element sources. Aspects include new systems and techniques for selecting, finding, and interpreting digital content pertaining to a subject matter context; new systems and techniques for deconstructing digital content into discrete content elements containing content segments that are classified according to a schema of element facets, and then constructing a facet-segmented repository of discrete content elements pertaining to a target identity; new systems and techniques for supplementing existing digital content with supplemental information; and new systems and techniques for creating and presenting a virtual experience container that is adapted to the beholder and the capabilities of the beholder's user experience device, for example, by supplementing content to support the presentation of expanded dimensions or sensory capabilities.

The systems and techniques described herein have numerous technical features with advantageous technical effects. For example, techniques and systems described herein advantageously provide technical methods for the extraction and separation of information facets from the base content returned from element sources, thus transforming content and metadata from the technical form usually returned from an element source (e.g., JSON, XML, HTML, images, video files, document files, and other proprietary formats) into discrete content elements that can be individually and separately used to construct a facet-segmented repository (and, ultimately, a bespoke virtual experience container). An advantageous technical effect of the stored facet-segmented repository is that content relating to a target identity in any given search result can be deconstructed and stored in facets so that it may be used to rapidly build bespoke virtual experience containers with greater processing efficiency, lower user wait time, and decreased overall storage costs. Processor load on external systems and network traffic may also be reduced, as searches for particular kinds of content may be executed less frequently (or only once) against a given element source. Facet-segmented repository discrete content elements can be reused many times across multiple subject matter prompts and beholder requests for a virtual experience.

Systems and techniques for supplementing existing digital content with supplemental information, content, and/or expanded dimensions, sensory capabilities, and personality aspects have the advantageous technical effect that virtual experience containers can be created that overcome informational and quality shortcomings in content that was gathered at the time of the event or life experience occurred. Existing digital content can be enhanced or improved using the described supplementation techniques, leading to a richer and higher quality beholder experience of content than can be provided by existing technical methods for storage and playback of digital content.

Another advantageous technical feature of the disclosed techniques and systems is that a virtual experience container is constructed so as to specifically target the capabilities of the user experience device. In other words, each virtual experience container is a bespoke assembly of content elements that makes effective use of the user experience device's particular sensory-effect capabilities. Bespoke assembly based on user experience device capabilities and the layered virtual experience container structure presented in certain embodiments enable a virtual experience container structure that is dynamically arranged and flexible enough to accommodate a wide array of virtual experience variations (e.g., depending on beholder request and user experience device parameters), with the effect that virtual experience container data size is optimized for storage and transmission across networks. This methodology of distinct targeting enhances the beholder's experience and makes efficient use of computing resources such as processing power, memory, and network bandwidth.

Other advantageous technical effects are discussed in the Detailed Description in relation to the technical features of specific embodiments.

Note: This Brief Summary is provided to introduce a selection of concepts in a simplified form that are further described below in the Detailed Description. The Brief Summary is not intended to identify key features or essential features of the claimed subject matter, nor is it intended to be used to limit the scope of the claimed subject matter.

DETAILED DESCRIPTION

The following describes certain embodiments and implementations of disclosed techniques and systems, as well as variations, scenarios, and examples.

Figure 1:
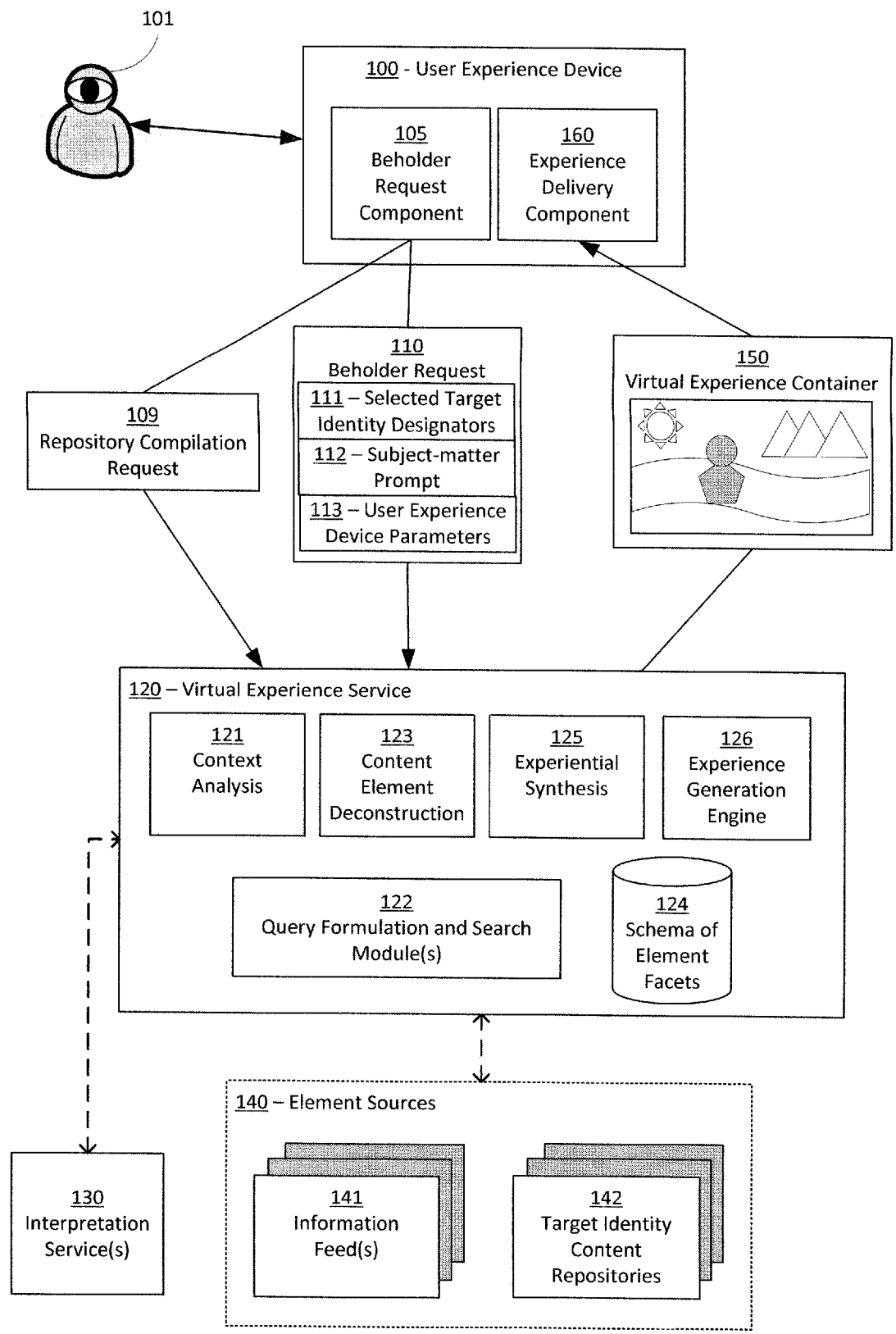
FIG. 1 shows an example component environment in which some implementations of systems and techniques for providing a virtual experience of target identities in a subject matter context on a user experience device can be carried out.

FIG. 1 shows an example component environment in which some implementations of systems and techniques for providing a virtual experience of target identities in a subject matter context on a user experience device can be carried out. In brief, the example component environment includes a user experience device 100 that houses a beholder request component 105 and an experience delivery component 160. At the behest of a beholder 101, the user experience device 100 communicates with virtual experience service 120, which may in turn connect to one or more content interpretation services 130 and element sources 140. User experience device 100 (including beholder request component 105) makes requests of the virtual experience service 120 by sending a repository compilation request 109 and/or beholder request 110 that describes properties of the selected target identities, the desired subject matter, and the parameters and capabilities of the user experience device. Virtual experience service 120 performs various activities, described in more detail below, to construct a virtual experience container 150 that presents a multi-faceted and flexibly-dimensional virtual experience of the selected target identities in a subject matter context, matched to the capabilities of the user experience device 100. The user experience device 100, via experience delivery component 160, receives the virtual experience container 150 and renders it according to the specific user interaction and sensory effect capabilities of the user experience device 100. It should be noted with respect to FIG. 1 that any characterizations of process flow are summarized, non-limiting, and are provided for the purposes of understanding an example component environment from one perspective.

In general, a virtual experience is constructed on behalf of a beholder 101. The term "beholder" (as used in FIG. 1 and elsewhere herein) refers to the person or people engaging with a virtual experience on a user experience device, apparatus, or system. Engagement with the virtual experience includes but is not limited to seeing a scene or target identity in two or more dimensions, hearing sounds (including, e.g., voices, ambient noises), having a conversation with a person, entity, or thing in the virtual experience, receiving bodily tactile sensations, including touch, pressure, body or limb positioning/orientation, and haptic feedback, and/or sensing smells or tastes generated by the user experience device in accordance with the virtual experience. The beholder 101 is typically the person (or people, or entity such as an automated agent) who interacts with the user experience device 100 to initiate a repository compilation request 109 or beholder request 110 that indicates the desired target identities and who creates, reviews, and selects the subject matter prompts from which the virtual experience is derived and constructed. In some embodiments, a beholder may also upload or otherwise provide access to certain content about a target identity. While referred to predominantly in the singular herein, it is expected that multiple beholders may collaborate in the initiation of a beholder request, including its various aspects, and that multiple beholders may mutually participate in or share the experience of any particular virtual experience via a common user experience device or separate user experience devices.

A "target identity" describes the personality, person, or other entity from whose perspective a virtual experience is to be constructed. A target identity can be a real person, either currently alive or deceased. A target identity can be known to the beholder (e.g., a personal acquaintance, colleague, relative, friend, ancestor), or the beholder may never have met the target identity personally (e.g., distant ancestor, previously deceased relation, historical figure). A target identity may in some cases be a fictional person, such as a character from a novel, movie, game, or other source of fiction. A target identity may also be a "legal person" such as a company, corporation, organization, firm, non-profit, or other institution that "acts" as if it had values, goals, intention, and experiences events/milestones (e.g., a product launch, shareholder meeting, sale of one million products, etc.). A target identity may also be a department, assembly, or other body of individuals acting collectively. In some cases, multiple target identities are selected to be part of the virtual experience, and some techniques may be applied to each target identity separately or collectively to one or more target identities, depending on the subject matter context and the nature of the desired virtual experience (e.g., Thanksgiving holidays with Grandma and Grandpa). Sometimes, the target identity is the identity of the beholder, e.g., when the beholder wants to relive a past experience. The term "target identity" may be used to refer to a target of a repository compilation request 109 or a target of a beholder request 110. Sometimes the term "selected target identity" may be used to refer to a particular subset of targeted identities.

User experience device 100 (sometimes abbreviated "UED" herein) may be understood to be a computing device that has certain capabilities to receive a virtual experience container and render sensory effects in a beholder 101 as part of a virtual experience. One aspect of the described techniques and systems is that any particular virtual experience container delivered to a user experience device 100 is matched to the capabilities of the user experience device 100 on which it is being rendered. Some capabilities a user experience device 100 might have include, for example, the ability to render video in 2D or 3D, render holograms, create lighting effects or lighting conditions, hear and interpret speech/sounds, generate tactile sensations or positional sensations (e.g., touch feedback, pain, temperature, sense of balance, pressure, vibration, sense of body parts and movement, chemoreception), and cause gustatory or olfactory sensations in a beholder 101. Components of a UED with the capability to create such sensory effects in a beholder may be referred to as the UED's sensory effect hardware array.

Computing devices with these kinds of capabilities may have several possible morphologies, of which user experience device/system 600, discussed below with respect to FIG. 6, may be representative. As noted, the sensory content in the virtual experience container 150 is matched to the capabilities of the user experience device 100. A virtual experience container 150 sometimes may be rendered effectively on a device using a limited range of sensory effects. In many scenarios, however, virtual experience(s) on a user experience device 100 are expected to be significantly more complex when enabled by the techniques and systems described herein. The capabilities may span a spectrum ranging from one type of sensory effect (e.g., visual only) to many or even all of the possible types of sensory effects. Some of the morphologies of a UED are described below.

For instance, a virtual experience container 150 may be rendered on a user experience device 100 that is a general-purpose computing device with the ability to run one or more applications. For example, the user experience device 100 may be, but is not limited to, a personal computer, a laptop computer, a desktop computer, a tablet computer, a reader, a mobile device, a personal digital assistant, a smart phone, a smart television, and a wearable computer such as a computer (or "smart") watch. User experience devices such as these may have the capability to render a powerful but limited range of sensory effects depending on their hardware components; for example, a personal computer or laptop may have the ability to render visual and auditory sensory effects but not touch, gustatory or olfactory; or, a smart watch may have limited ability to render a visual sensory effect, but renders auditory effects quite well; or, a mobile device with a camera and geolocation sensors might have the ability to integrate real-time camera images and geolocation information in the ambient environment of the beholder 101 into a virtual experience to create an augmented reality visual sensory effect for the beholder 101.

Sometimes, a user experience device 100 may have a wider or different range of sensory effect capabilities, such as a gaming device or console with several types of optional integrated interface devices, a wearable computer with an optical head-mounted display, and a specialized virtual reality device. User experience devices such as these may have the capability to render a diverse range of sensory effects depending on their integrated and optional hardware components. For example, gaming devices are well-suited to render complex video that simulates moving in three dimensions, a powerful auditory experience, and robust navigation capabilities within a virtual experience. Additional hardware components integrated with or coupled to these devices, such as force-feedback joysticks and haptic feedback gaming chairs, can allow a virtual experience container 150 to direct the rendering of positional and touch feedback sensory effects on the UED. Virtual reality (VR) and/or augmented reality (AR) devices can enable immersive 3D sensory effects and complex positional feedback in a virtual experience. Sometimes, a user experience device 100 may be transformed by integrating two separate devices to yield a device with greater capabilities.

User experience devices 100 with unusual form factors and unconventional hardware integrations are contemplated to provide sensory effects for the virtual experience. These include, for instance, a sensorium device (e.g., a "Sensorama"), a sensorium room, sensory feedback body suit, and a VR device with smell and/or olfactory feedback capabilities. A "Sensorama" (a device envisioned in the 1950's by cinematographer Morton Heilig) comprises a box into which a person inserts their head for a full viewing experience of a movie, accompanied by stereoscopic sound and time-released aromas matching the smells of the environment in the movie. A sensorium room is a room which provides a variety of sensory effects to a beholder occupying the room, including visual experiences in 360 degrees of rotation in the visual field, auditory effects, location effects, some kinds of touch effects, and potentially smell and taste effects. A sensory feedback body suit may provide a full range of touch and positional feedback to all parts of the body, including, e.g., pain, temperature, sense of balance, pressure, vibration, sense of body parts and movement, and chemoreception. A conventional VR device may also be fitted with smell generators near the nose to induce certain olfactory responses in the beholder 101, as well as a hardware device that can be fitted on the tongue or in the mouth to induce gustatory sensations in the beholder 101.

Multiple devices may be integrated to form a combined user experience device enabling more sensory-effect capabilities than a single device alone might be able to provide. For example, devices are available that fit on a mobile device and transform the mobile device into a VR-capable device that can be worn over the beholder's eyes (e.g., Google® Cardboard). As another example, a sensorium room may be combined with a body suit to render the full range of immersion experiences and touch feedback of which both devices are jointly capable.

In some cases, the beholder request component 105 and the experience delivery component 160 can be components of an application resident on the user experience device 100, allowing the beholder to perform various virtual experience-related tasks. For example, an application can be a desktop application, mobile device app, or control menu on a gaming, VR, or smart TV device that interacts with a virtual experience service 120 resident in the "cloud." An application can also be based on script and content that, when rendered on a web browser, displays various user interaction capabilities on the user experience device 100.

Repository compilation request 109 is a software-based request received by a virtual experience service 120, instructing it to construct a facet-segmented repository containing discrete content elements suitable for assembling a virtual experience of a target identity. In some cases, a repository compilation request 109 may be issued upon indication by a user, e.g., a beholder 101, via a user experience device 100 to virtual experience service 120. In some cases, a repository compilation request 109 may be sent from a system, service, or automated process.

A repository compilation request 109 can contain several aspects. One aspect is a target identity designator. A "designator" (or, "designator data structure") for a target identity is a data structure that identifies the target identity as uniquely as possible. The designator data structure may contain the target identity's name, biographical information (e.g., birthdate and place, ancestry), age, race, ethnicity, religion, email addresses or telephone numbers, a photo, demographic data, biometric data (e.g., body part recognition data, such as facial recognition data, fingerprints, or gait analysis data), all or part of the target identity's genome, or other kinds of information. In many cases, a target identity has content stored in several online accounts spanning many systems. For example, target identities (including individuals and organizations) usually have accounts on more than one online social network (OSN). Therefore, the designator data structure may also contain user identities (e.g., handle, username, user account, account number) and, optionally, login credentials (e.g., user id/password combinations, identity tokens, authorization tokens allowing access to the content of the target identity) for a multiplicity of accounts belonging to the target identity, both locally and in the cloud. The user identities and other information in the designator may be used to access public information of the target identity (e.g., via a web search, public records search, or public API query), semi-private information which is accessible when the beholder has a relationship with the target identity (e.g., the beholder is a "friend" of the target identity on an OSN), and private information in the target identity's accounts when the target identity has shared login credentials or authorization tokens with the beholder 101, or provided access to content to the beholder 101 (e.g., a father who shares access to photos in his Apple iCloud® account with his daughter).

Another aspect of a repository compilation request 109 may be a topical limiter. A topical limiter is a directive (e.g., indicated by a user of a user experience device), that more specifically describes the topic or subject matter of the content to be placed in the facet-segmented repository. A topical limiter, when included in a repository compilation request 109, may inform the selection of the set of element sources and/or the query terms to be sent to the set of element sources. Operationally, the contents of the target identity designator and topical limiter may be used, among other things, by the virtual experience service 120 to access and direct content searches across the different types of element sources 140, including information feed(s) 141 and target identity content repositories 142.

A beholder request 110 can contain several aspects. One aspect is a collection of selected target identity designators 111 which indicate the selected target identities from whose perspective from which the virtual experience container 150 should be constructed. A selected target identity refers to the personality, person, or other entity being placed in a designated subject matter context. The selected target identity designates the perspective and, effectively, the operative element sources from which the virtual experience of the subject matter prompt can be derived. For example, a grandson (the beholder in this scenario), on his wedding day, may want to have a virtual experience of his long-deceased grandpa using the subject matter prompt, "Talk to grandpa about married life after 45 years of marriage." In this example the target identity is grandpa, as it is grandpa's personality and life experiences around which the virtual experience is constructed. Beholder request 110 can be formed by a beholder 101 interacting with user experience device 100 (e.g., via an application or other interface) to indicate the beholder-selectable aspects of the beholder request.

Another aspect of a beholder request 110 is a subject matter prompt 112. A subject matter prompt 112 conveys to the virtual experience service 120 one or more topics around which to frame the selected target identities' activities within the virtual experience container 150. Generally, the beholder 101 interacts with the user experience device 100 to construct a new subject matter prompt or select from available subject matter prompts. The subject matter prompt 112 can take a variety of forms, from a short textual description to a submission of media or other content that, when analyzed by virtual experience service 120 (e.g., using context analysis 121 component), begets a subject matter context in which the target identities act. Subject matter prompts expressed in language may be written, spoken, or otherwise communicated through natural language, descriptor words, or other form, including language in any form such as sign language or braille. Some examples are provided to elucidate the possible forms of subject matter prompts, though these examples are not intended to be limiting:

Example ES1: An actual event prompt, "Mary's and my wedding ceremony," results in the construction of a virtual experience of the wedding ceremony of the beholder and his wife Mary. The virtual experience is constructed from video footage taken from the couple's videographer's repository as well as from content recorded on the mobile phones of several friends in the audience. Weather and other atmospheric conditions at that geolocation are simulated and displayed on a VR-capable user experience device. An actual event descriptor in a prompt can be a description of an event or a temporal marker, such as a calendar date or universal date.

Example ES2: A memory prompt, "My time in Paris with Alberto," results in the construction of a virtual experience derived from media of the beholder and Alberto together during the month they lived in Paris.

Example ES3: A life experience prompt, "Dad as a soldier," results in the construction of a virtual experience derived from photographs, letters, military records, and other content relating to Dad's different postings Dad had during his time in the Army.

Example ES4: A topic of conversation prompt, "Grandpa's advice on marriage after 40 years of being married," results in the construction of a virtual experience in which the beholder can have a conversation with an avatar of Grandpa, by asking him a variety of questions relating to marriage and receiving responses from the avatar that are consistent with the personality and opinions of Grandpa as reflected in his digital or digitized writings (e.g., emails, love letters, etc.).

Example ES5: A gesture prompt, such as "How did Grandma Nell walk?" or "My brother doing the martial arts kata called 'Rising sun'," shows a virtual experience of the given target identity performing the requested activity, derived, for example, from real media of the person performing the activity or by overlaying an avatar of the target identity onto gestural content of another.

Example ES6: A hypothetical situation prompt, "What would my father have done if confronted by an aggressive driver?" results in a depiction of the beholder's father interacting with an aggressive driver consistently with the father's personality.

Example ES7: A fictional event prompt, "How would Sherlock Holmes have investigated the death of Joffrey in 'Game of Thrones'?" results in the construction of a fictional interaction between Holmes and various characters who were accused of killing Joffrey in the TV series. The virtual experience is consistent with the personalities of the fictional characters and the fictional circumstances as described in the textual matter of the books and images in the video depictions.

Example ES8: A prompt with the "Cat in the Hat" e-book and the request to "Have Grandpa read me this story," results in the construction of a virtual experience of Grandpa's voice reading his young grandson the story using Grandpa's voice, as reconstructed from spoken phonemes recorded in Grandpa's content repositories.

Example ES9: A digitized item prompt, "My son's favorite toys growing up," results in the construction of a virtual experience that renders the son's toys that have been digitized and rendered in 3D volumetric imagery against a backdrop projection (e.g., on a multimedia screen) of a photograph of his first bedroom.

Example ES10: A digitized rendering of an old ticket stub from Woodstock found among Dad's things is presented in a user interface that renders a virtual reality anchor setting showing Dad's garage. Selecting the digitized ticket stub on a user experience device that includes olfactory sensory-effect capabilities initiates a VR setting of Woodstock constructed from old footage, enhanced by the soundtrack of the concert and the smell of mud and wet grass obtained from an element source.

As the above examples show, a subject matter prompt 112 can also range in definiteness from relatively definite to more suggestive. A very specific subject matter prompt (e.g., "our wedding ceremony" or "read me this story in Grandpa's voice") leaves little ambiguity about the desired subject matter, while a more suggestive or open-ended prompt (e.g., "our time in Paris") allows wide latitude in how the subject matter context is to be interpreted by the virtual experience service 120. To determine a relevant subject matter context, subject matter prompts that are more open-ended may require an extensive amount of analysis on the part of the virtual experience service 120 of the inputs of the prompt and/or the content available in element sources.

In some cases, a subject matter prompt may be developed iteratively or interactively with the beholder, for example, to narrow down an open-ended prompt or suggest options to a beholder. For instance, the beholder request component 105 may, at the direction of the virtual experience service 120, present additional options on the UED 100 to the beholder 101 after an initial beholder request has been formulated. For example, if the prompt "Dad as a soldier" elicits too much content, the beholder request component 105 might render a prompt asking the beholder "How about Dad's experiences during the Korean War?"

Further, if a target identity is relatively unknown to the beholder (e.g., adoptee's biological father) or has a large amount of digital content the beholder is unfamiliar with, suggested subject matter prompts may be useful. Therefore, in some embodiments, a virtual experience service 120 may perform analysis of a target identity's content prior to a beholder request (e.g., in response to a repository compilation request) in order to suggest subject matter prompts to the beholder based on major themes in the target identity's content repositories.

Various kinds of beholder interactions with the user experience device 100 are possible to indicate these varied aspects of a beholder request 110. Naturally, common user interface elements such as menus, command buttons, search and text boxes, right-click context menus, and touchscreen device gestures may be used to select a target identity (by name or other moniker) and describe a subject matter prompt in which the virtual experience of the target identity is to be constructed. A beholder 101 can interact with a user experience device 100 that is capable of detecting and interpreting voice commands and human speech in order to issue spoken textual descriptions to indicate aspects of the beholder request 110. A beholder can also be creating, using, or consuming content (such as a document, article, photo, or video) in another application and can indicate a subject matter prompt using an indication motif provided across the entire user experience device by the beholder request component 105.

In some embodiments, a beholder 101 can use the UED 100 to provide a set of content via the beholder request 110. This "beholder-provided content" can be transmitted to the virtual experience service 120 as part of the beholder request 110 and may be used by the virtual experience service 120 to develop a virtual experience container 150. Beholder-provided content can be, for example, textual (e.g., documents, emails, or other written content), images, photographs, video, and sound recordings. The beholder may use an interface element provided by an application or the beholder request component 105 to upload or otherwise point to the beholder-provided content. Beholder-provided content may be used by the virtual experience service 120 as context for the subject matter prompt. The beholder-provided content may be used as a source of content for constructing the virtual experience container 150.

As previously noted, different user experience devices may have different capabilities and morphologies: some devices (e.g., a tablet computer) have the ability to deliver virtual experiences having only one or two kinds of sensory effect (e.g., only 2D video and sound), whereas others (e.g., a sensorium room) can deliver experiences spanning the entire human sensorium. One advantageous technical feature of the disclosed techniques and systems is that the virtual experience container 150 is constructed by the virtual experience service 120 so as to specifically target the capabilities of the user experience device 100. In other words, each virtual experience container 150 is a bespoke assembly of content elements that makes effective use of the user experience device's particular sensory-effect capabilities. This methodology of distinct targeting enhances the beholder's experience and makes efficient use of computing resources such as processing power, memory, and network bandwidth.

To support this technical feature, user experience device parameters 113 may be communicated as part of a beholder request in some implementations. User experience device parameters 113 are data structures that transmit essential information about the user experience device's various sensors, actuators, rendering capabilities, and other resources to the virtual experience service 120 so that the virtual experience can be specifically targeted to the user experience device 100. In some cases, a beholder's experience delivery preferences may also be included in the user experience device parameters 113. For example, the beholder may not want to experience touch sensations even if the user experience device is capable of delivering them. The synthesis of content elements into a virtual experience targeted at device capabilities is described more fully below, along with the discussion of processing associated with a virtual experience system or service.

Beholder request component 105 and/or experience delivery component 160 may be integrated with an application as an inherent feature or as a plug-in or extension for an existing application to provide the beholder request and experience delivery features. Although often described herein as being incorporated within the same user experience device 100, sometimes beholder request component 105 and experience delivery component 160 may be present on separate physical computing devices that logically form a user experience device 100—for example, as when one device (e.g., a mobile phone "app") is used to initiate a beholder request 110 via a beholder request component 105 that gets delivered (e.g., over a wireless network or other device interface) to a separate device having the experience delivery component 160. A single beholder request component 105 may even be used to initiate a beholder request 110 that can be delivered to multiple devices with their own experience delivery component 160, e.g., when multiple beholders wish to share a common virtual experience from the perspective of their own devices.

Components 105 and 160 facilitate the interaction between the user experience device 100 and the virtual experience service 120, for example through an application programming interface (API) of the virtual experience service 120. An "API" is generally a set of programming instructions and standards for enabling two or more applications to communicate with each other. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API and related components may be stored in one or more computer readable storage media. An API is commonly implemented as a set of Hypertext Transfer Protocol (HTTP) request messages and a specified format or structure for response messages according to a REST (Representational state transfer) or SOAP (Simple Object Access Protocol) architecture.

Beholder request component 105 may communicate with a virtual experience service 120 to send a beholder request 110 over a communications interface or network. Experience delivery component 160 may likewise communicate with a virtual experience service 120 to receive a virtual experience 150 over a network. The network can include, but is not limited to, a cellular network (e.g., wireless phone), a point-to-point dial up connection, a satellite network, the Internet, a local area network (LAN), a wide area network (WAN), a Wi-Fi network, an ad hoc network or a combination thereof. Such networks are widely used to connect various types of network elements, such as hubs, bridges, routers, switches, servers, and gateways. The network may include one or more connected networks (e.g., a multi-network environment) including public networks, such as the Internet, and/or private networks such as a virtual private network or secure enterprise private network. Access to the network may be provided via one or more wired or wireless access networks as will be understood by those skilled in the art.

As briefly described here, virtual experience service 120 receives a repository compilation request 109 and/or beholder request 110 and performs various operations for generating the multi-faceted and flexibly-dimensioned virtual experience container 150 that can be delivered on a user experience device 100. The virtual experience service 120 may process the repository compilation request 109 and beholder request 110 via one or more components, shown in FIG. 1 as performing context analysis 121, query formulation and search 122, content element deconstruction 123, experiential synthesis 125, and experience generation 126. Processing components may utilize novel data structures such as the schema of element facets 124 to deconstruct existing digital content into discrete content elements that can be reassembled into a virtual experience container 150 of the subject matter context in accord with the capabilities of the specific user experience device 100. These components may provide processing functions synchronously or asynchronously. The processing activities of virtual experience service 120 and any of its subcomponents are described more fully with respect to the example process flows in FIGS. 2A-2B and 4A-4C.

Generally, context analysis involves analyzing aspects of the repository compilation request 109 and beholder request 110 (e.g., the target identity designators 111, subject matter prompt 112, user experience device parameters 113, and beholder-provided content, if any) for appropriate target entities, sentiments, and relationships, and for subject matter context gleaned from the subject matter prompt and beholder-provided content. Context analysis may also involve analyzing search results in the performance of content element deconstruction (see, e.g., FIG. 2A).

A virtual experience service 120 (e.g., using context analysis component 121 or other subcomponents) may interact with or direct requests to content interpretation service(s) 130 to assist in the identification of concepts in various kinds of content, including subject matter prompts, beholder-provided content, content repository media, and information feeds. Content interpretation service(s) 130 can be used to, for example: identify the grammatical or semantic structure of text, discern key concepts in text, translate text, and identify entities in text; classify objects or places or identify people in images, caption images, perform video and speech interpretation to elicit concepts, identify a speaker, translate speech, identify and track faces, and index content; and analyze the "sentiment" expressed by speech, text, or images. Different kinds of content interpretation service(s) 130 may be provided by third-party service providers such as Microsoft Azure®, Amazon® Web Services, or Google®, for example via an API of those services. This brief description should not be considered limiting, and context analysis is described more fully with respect to the example process flow in FIG. 2A.

Virtual experience service 120 uses subject matter context and target identity information gleaned from context analysis to formulate queries and search for content elements stored in element sources 140 (e.g., via query formulation and search component 122). Element sources 140 provide the major content elements from which a virtual experience is built. Element sources 140 include both public and private information. Element sources 140 can take many forms and can generally (but not limitingly) be grouped into information feed(s) 141 and target identity content repositories 142.

Information feed(s) 141 are, generally, public information repositories or services, in many cases maintained and operated by third-party services. They contain digital or digitized content that is publicly accessible, in both structured and unstructured but interpretable forms, using one or more technical means, such as via an API of the information feed or screen-scraping of a web page. Generally, digital content refers to information that originated as electronically stored information, such as a word processor document or digital photograph. Digitized content refers to information that originated in non-digital or physical form (e.g., a physical object or printed photograph) but was later digitized (e.g., by scanning a photograph or document, interpreting scanned text with optical character recognition, or making a three-dimensional scan of a physical object such as a trophy, piece of jewelry, or other treasured item).

Examples of information feeds 141 include services that provide data about weather, such as current weather conditions and historical weather records; public or unrestricted-access online social media network accounts; calendars of events, including public events down to the local happening level; GPS; maps, including terrain maps and topological maps; satellite imagery (e.g., Google Earth®); traffic data; ratings services; websites containing products for sale; news websites and wire feeds; magazine and journal content, whether originally published online or archived; internet archives of the way content appeared at a past time (provided by services such as the Internet Archive "Wayback Machine"); online encyclopedias or wikis; economic data, such as mortgage rates, stock price data, and other financial market performance data; political data or records (e.g., election results, campaign data); astronomical conditions (tide, star location, moon, sunrise/sunset); image databases; video databases; audio/voice databases or archives; digital music repositories; film libraries; property ownership and taxation records; real estate listings; driving license records; the online yearbooks of schools and universities; bestseller and top-seller lists (e.g., the New York Times Bestseller list or the Billboard Top 100); information regarding styles or trends, such as in the areas of home décor, fashion, or jewelry; sporting contest results; and databases containing ancestry and genealogical information.

Target identity content repositories 142 contain digital or digitized repositories of content or information belonging to a target identity or a third-party with which a target identity has content sharing or access rights. They may be private or public repositories, stored locally, on a private network, or on a third-party service. Target identity content repositories 142 are accessible in both structured and unstructured but interpretable forms using one or more technical means, such as via an API of the content repository service or screen-scraping of a web page.

Examples of target identity content repositories 142 include: online social network data (including privately shared data), including written and media posting content, indicators of sentiment and emotion, tags, information about contacts and relationships; personal, shared, and work-related event calendars; email accounts; online, cloud-based, and locally-stored media repositories containing photos, videos, voice recordings, and/or music; cloud-based file storage services, such as Google® Drive and DropBox®; file repositories on local systems and/or private network shares; textual content written by the target identity, including online content in blogs, websites, and forum postings; personal photography; purchased or leased digital content (e.g., e-book, video, and audio collections stored locally or in the Cloud); video, audio, and other digital media/content recorded by third parties in which the target identity is shown; video, audio, and other digital media/content recorded by third parties of events attended in common with the target identity; beholder-submitted content relating to the target identity; sensor data of the target identity recorded by a third-party device; a previously-stored facet-segmented repository of the target identity; a third-party facet-segmented repository; travel itineraries; digitized versions physical artifacts such as mementos or collectibles that have been captured in physical form in various ways; digitized inventories of possessions such as clothing, jewelry, books, automobiles, online games, and other household items; recipes; to-do lists; shopping lists; contact lists; journals and diaries; concert and event tickets; school and university records containing degrees, diplomas, course schedules, grades, sports or extracurricular activities; resumes, curriculum vitae, and job histories; military service records; awards, trophies (e.g., from sporting or academic accomplishments); personal financial information; voting registrations; content produced from interactions with "chatbots" or other automated agents or entities; content produced from a DNA or genome analysis.

Virtual experience service 120 retrieves information from element sources 140 by constructing queries in accordance with each element source's own particular query semantics and directing them through search modules (e.g., via component 122). A search module may take myriad forms. A familiar kind of search module may be provided by or interact with a commercially available RDBMS, such as Microsoft SQL Server®, or a NoSQL database system, such as MongoDB. In some implementations, a custom database implemented in a relational database system that may have the capability to do full-text or semantic text processing can be a search module. A search module may be used to access information such as a structured file in Extended Markup Language (XML) format, or even a text file having a list of entries. A search module be arranged to search an element source by sending commands using the specific searching API language of the element source and then receiving and interpreting structured or unstructured results (e.g., JSON, HTML, or XML) returned from the element source in answer to the API commands. A search module may be built to optimize for the query of certain types of content, such as images, video, speech, or text. A search module can be a trained classifier of images, text, audio, or other content types that is used to search element sources for the specific content which the classifier is trained to find.

Different kinds of search module may have specific query forms, query operators, and methods of generating query terms. Query formulation and search module 122 component performs various kinds of transformations to determine query terms appropriate for each kind of search module and for each kind of targeted content and meta-content. Transforming the subject matter context and other content into query terms and formulating queries from the query terms are described more fully with respect to the example process flow in FIG. 2A. It should also be noted that content and information searching capabilities of the query formulation and search module(s) 122 may be employed incrementally, iteratively, in multiple stages, synchronously and asynchronously, and by multiple sub-components of the virtual experience service 120 (e.g., by context analysis 121, content element deconstruction 123, and experiential synthesis 125 components).

Having obtained certain content from element sources, virtual experience service 120 performs deconstruction of the obtained content into content elements (e.g., via 123) and re-classification, synthesis, and (in some cases) dimension-wise or facet-wise expansion of the content elements (e.g., via 125 and 126) into a unified virtual experience container 150 tuned to the capabilities of the user experience device 100. Context analysis may be performed on some content. These processing activities are described extensively in regard to the example process flows in FIGS. 2A-2B and 4A-4C.

Figure 5:
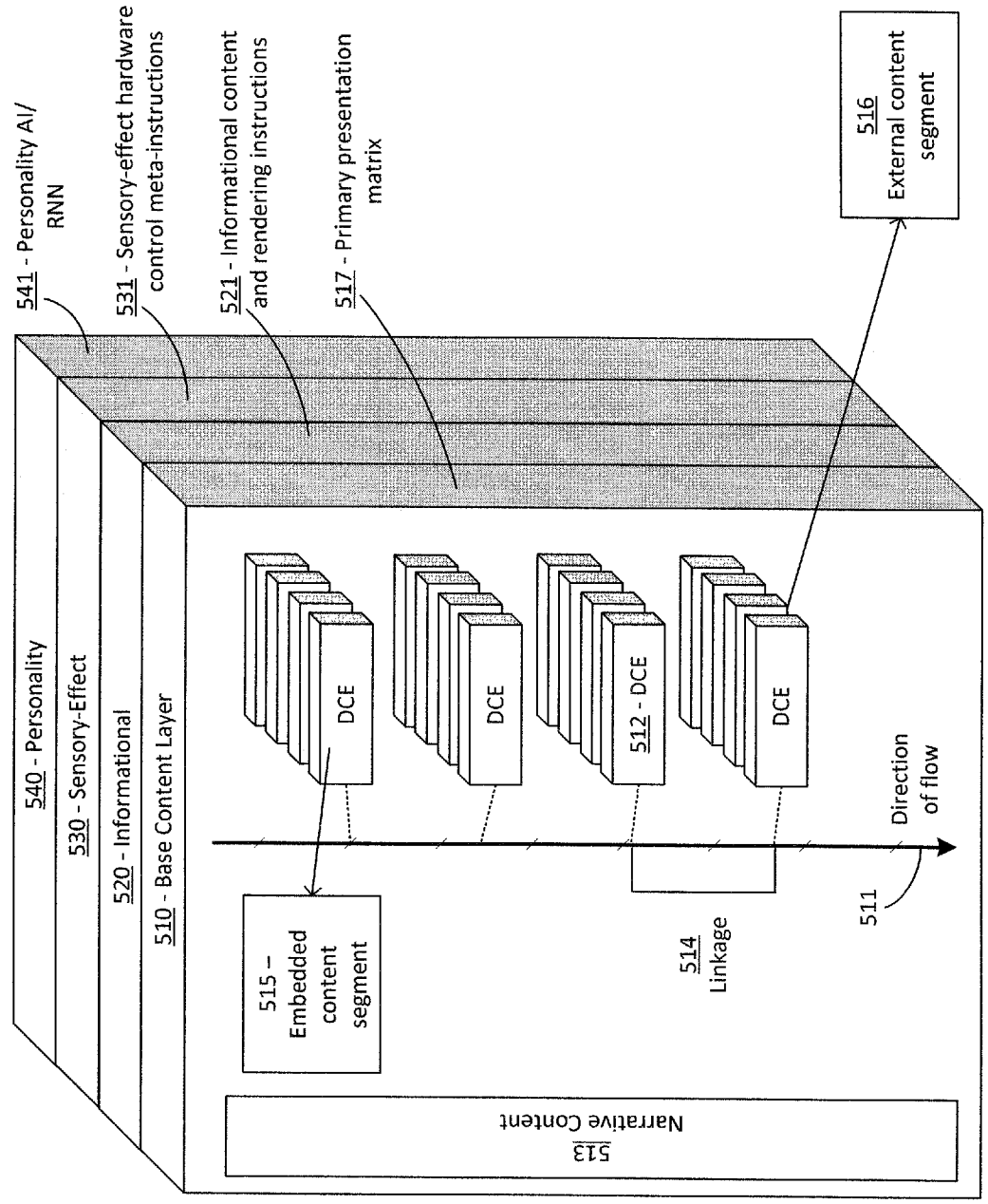
FIG. 5 shows a diagram of an example structural arrangement of a virtual experience container.

An experience generation engine 126 transforms the synthesized content into its final form as a bespoke virtual experience container 150 targeted at a specific user experience device 100. In brief, a virtual experience container 150 is embodied in a uniquely structured storage (e.g., a file or streamed data format) that contains (or links to) content elements that are unified by subject matter context into an experiential vignette. The content in the structured storage is arranged in multiple layers so that content may be experienced in various ways in accordance with one or more available and desired facet types (e.g., informational, sensory, and personality trait facets). A sensory-effect layer associates content segments, with specific control meta-instructions that induce sensory effects in the beholder 101 and that match the capabilities of the user experience device 100. FIG. 5 describes an exemplary storage structure for the virtual experience container 150.

Experience delivery component 160 may reside on the user experience device 100 to interpret the virtual experience container 150 structured storage and display the content embedded therein in its various dimensions. It also acts to interpret the sensory-effect layer of a virtual experience container 150 to transform control meta-instructions into specific instructions to the hardware device control software or firmware of the specific user experience device 100 at the time when the sensory feedback is relevant to the beholder's experience. Experience delivery component 160 may also have user interface elements for experience control logic to allow the beholder to control the nature of a virtual experience during the experience of it, e.g., by pausing the temporal stream of content playback, changing the perspective or point of view of the beholder (e.g., to another location, a target identity, or support persona in the content stream), and by selecting or deselecting one or more facet type.

It should be noted that, while sub-components of virtual experience service 120 are depicted in FIG. 1, this arrangement of the virtual experience service 120 into components is exemplary only; other physical and logical arrangements of a virtual experience service capable of performing the operational aspects of the disclosed techniques are possible. Various types of physical or virtual computing systems may be used to implement the virtual experience service 120 (and related subcomponents 121, 122, 123, 124, 125, and 126) such as server computers, desktop computers, cloud compute server environments, laptop computers, tablet computers, smart phones, or any other suitable computing appliance. When implemented using a server computer, any of a variety of servers may be used including, but not limited to, application servers, database servers, mail servers, rack servers, blade servers, tower servers, virtualized servers, or any other type of server, variation of server, or combination thereof. A system that may be used in some environments to implement a virtual experience service 120 is described in FIG. 7. Further, it should be noted that aspects of the virtual experience service 120 may be implemented on more than one device. In some cases, virtual experience service 120 may include components located on user devices, user experience devices, and/or on one or more services implemented on separate physical devices.

Figure 2A:
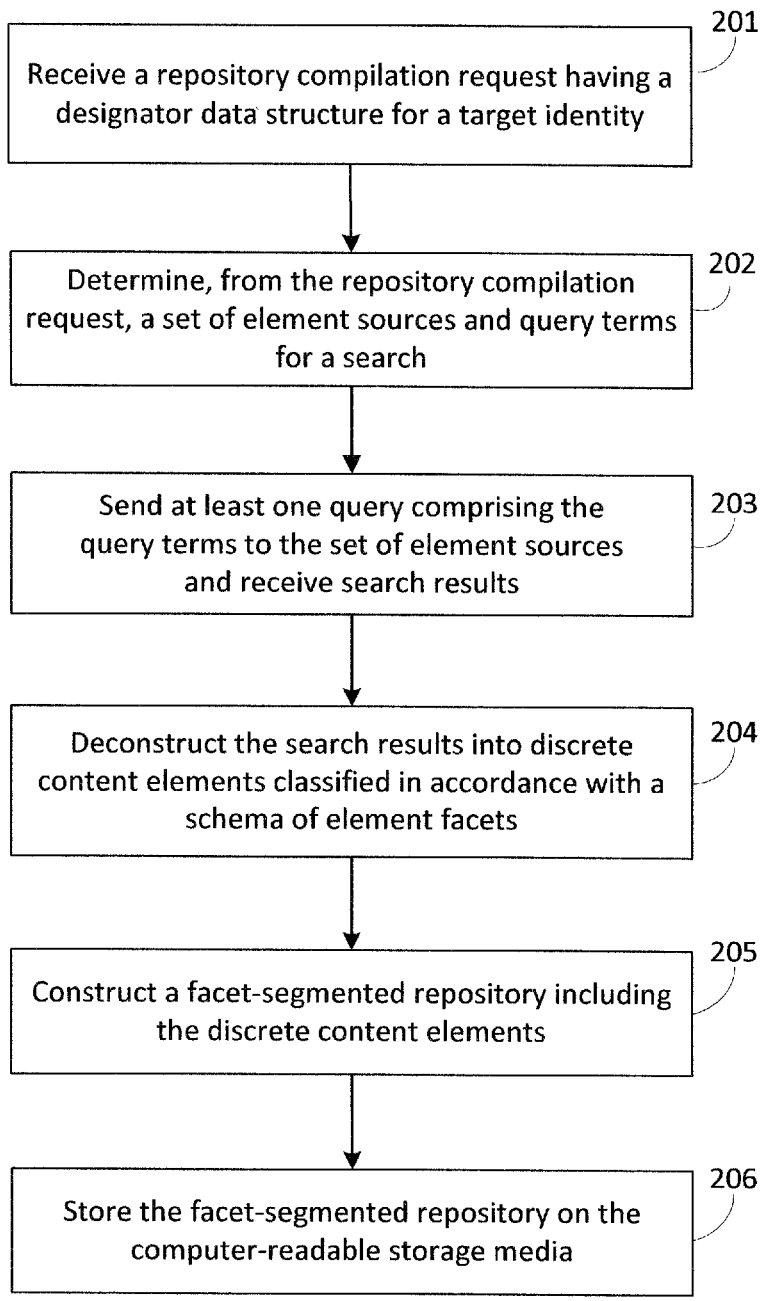
FIG. 2A illustrates an example process flow for aspects of a system/service that constructs a multi-faceted and flexibly-dimensioned virtual experience of target identities.

FIG. 2A illustrates an example process flow for aspects of a system/service that constructs a multi-faceted and flexibly-dimensioned virtual experience of target identities. This example process flow illustrates technical features that overcome certain technical limitations inherent in other mechanisms of presenting content about target identities. The disclosed techniques, illustrated in part by the example process flow of FIG. 2A, advance the technical art of constructing virtual experiences, enabling ad hoc, subject-matter-specific virtual experiences targeted to a beholder's specific user experience device to be assembled from diverse content and information sources. A process flow such as the example in FIG. 2A may be implemented as part of a system or service (e.g., virtual experience service 120 of FIG. 1) that facilitates construction of a virtual experience container.

Initially in FIG. 2A, a repository compilation request having a designator data structure for a target identity is received (201). A repository compilation request is a software-based request received at a system/service that instructs the system/service to construct a facet-segmented repository containing discrete content elements suitable for assembling a virtual experience container having selected target identities. The repository compilation request may communicate one or more tangible data structures, including a designator data structure (described in FIG. 1) for a target identity, that indicate the nature of the content to be gathered for the facet-segmented repository. These varied aspects are described in concert with capabilities of various embodiments and examples below.

Figure 6:
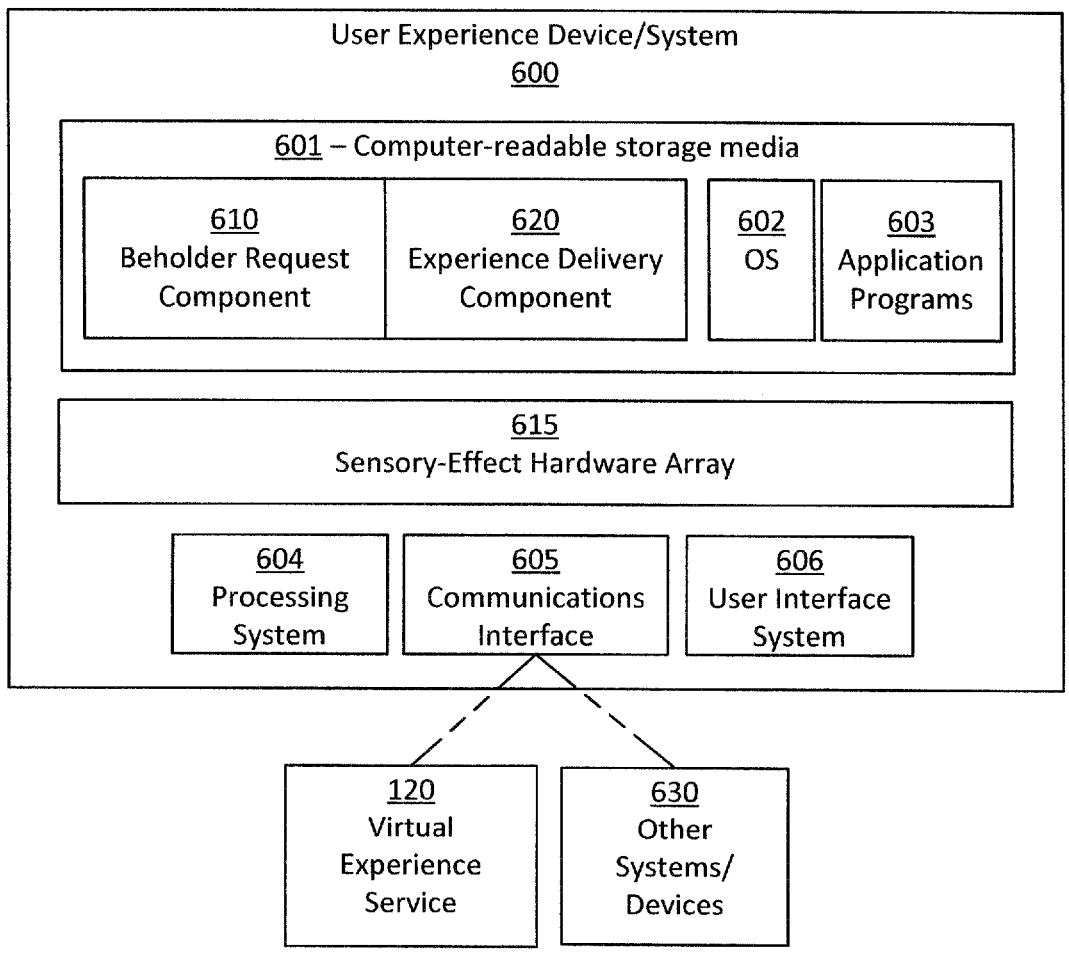
FIG. 6 shows a block diagram illustrating an example embodiment of a user experience device/system for selecting and presenting a virtual experience container to a beholder.

A repository compilation request may be initiated, generated, or modified in a variety of ways, including (but not limited to) as a result of a user's interaction with user interface elements of a user experience device, application, web site, or mobile device "app," as described, e.g., in FIG. 1 and FIG. 6. In certain implementations, the repository compilation request can also be generated via automated processes resulting from automated agents (of the system/service or other third-party services) executing periodically on a time schedule or in response to other triggering conditions. In some cases, the repository compilation request may be generated by an automated agent, or "bot," that acts autonomously based on a learned response from aggregate conditions, or from the past behaviors of a beholder, target identity, or other requestor. The repository compilation request may be received by a system/service implementing the process flow, for example, in response to a function call or API call from a component on a user experience device, on a system implementing an automated process, or elsewhere.

In some embodiments, the repository compilation request may include a topical limiter. A topical limiter is a directive (e.g., sent by a user experience device), that more specifically describes the topic or subject matter of the content to be deconstructed for placement into the facet-segmented repository. A topical limiter, when included in a repository compilation request, may inform the selection of the set of element sources or the query terms to be sent to the set of element sources. A topical limiter may, for example, narrow or widen the set of element sources chosen to construct a particular facet-segmented repository, or have the effect of adding, modifying, or removing query terms from those used as search parameters. A topical limiter can take various forms, including but not limited to a written or spoken textual descriptor (e.g., "travel in France"); an image or multimedia content that is used as model topical content (e.g., an image of a dog may be provided as a topical limiter if a facet-segmented repository is to be constructed around content relating to the target identity and dogs; a video taken of the target identity's family at the beach may be provided as a topical limiter for content relating to family time, beach, or vacations); a sound recording that denotes a musician or musical genre (e.g., a recording of a country artist might serve as a topical limiter for content relating to music, country music, the country artist, or content related to the target identity's attendance at concerts or music festivals); a voice recording might be a topical limiter for content relating to a particular speaker (e.g., a recording of a target identity's grandfather).

Aspects of the repository compilation request may be used to determine a set of element sources, and query terms specific to those element sources, for searching the set of element sources (202). Search queries then may be sent to the individual element sources and the search results received (203). A variety of possible element sources are described in regard to FIG. 1, and the nature of any particular element source may determine both the possible query terms that can be used to search the element sources and their ultimate form. For example, relational database systems may use query terms formulated in a query language such as Structured Query Language (SQL); XML-based data repositories may be searched with full-text searching techniques applicable to files, or with XML-document processing logic; some element sources may only be searchable using a distinctive query language accessible through an API of the element source.

In some cases, a virtual experience system/service needs to transform the structure of the query terms into a query language form suitable for functioning with a particular database service or to a form compatible with the particular API of a targeted element source. For example, the OSN Facebook® visualizes its data as a graph consisting of nodes (entities), edges (relationships), and information fields; Facebook provides programmatic access to these entities using its Graph API. Obtaining particular entities from Facebook requires the system/service to transform the query terms into a properly formed Graph API "GET" request. Alternatively, Twitter® has a different API structure, and obtaining data from Twitter requires different transformations of the query terms to formulate the query.

It should be noted that varying kinds of query terms can be combined to target, for example, unions, intersections, or disjoint sets of content. The different query terms can be joined, for example, by Boolean logical operators, relational or comparison operators, fuzzy logic operators, text-matching and text proximity operators, and other types of operators that might be found, for example, in a query language such as Structured Query Language (SQL) used in a relational database system.

The term "query" is meant expansively. For instance, each element source may be sent its own specific query or set of queries, each of which may be constructed in the particular form pertinent to the type of element source. The search queries related to a particular repository compilation request may be sent at the same time or staggered in time, and they may be sent synchronously or asynchronously. Some of the set of queries sent to an element source for a particular repository compilation request may batched together and sent at a different time than the other members of the set; for example, a second or subsequent batch of queries may be sent after the search results from the first or prior batch has been received and processed.

In some embodiments, as when an element source comprises private content accessible only to privileged accessors, credentials, permissions, and/or an access token may be sent along with a set of queries provide the necessary accessor privileges. In some cases, a designator data structure for a target identity may include an access token of the target identity that allows the system or service to search the element source (e.g., the element source is a target identity content repository 142) for private content belonging to the target identity. Some embodiments may include a user experience device module allowing a target identity or a beholder to maintain a registration repository containing login credentials/access tokens for providing access to element sources with private content.

Search results may be received in whatever form appropriate to the type of element source to which the search query was sent. For example, an RDBMS might return the search results as SQL row-sets, or an OSN such as Facebook might return the results as structured JSON, XML, or HTML.

The search results are now deconstructed into discrete content elements that are classified in accordance with a schema of element facets (204). Generally, search results from any element source may contain information of relevance in both the content and the metadata. "Content" typically is intended to mean those aspects of search results that have direct informational value to an application or person, such as the text and images in a social media post or file. "Metadata" (or, alternatively, "meta-content") generally refers to data about content or other data entities. Metadata generally directs a process to the location of data, or stores additional context information about the data, such as the last time it was updated or its relations to other data.

For example, the words in a simple text file are its content, but the "modified time" on the file is part of its metadata. In the case of a social media post on an OSN including a photo, the content includes the photo itself and text the posting user typed in, whereas the metadata includes the posting time, geolocation of the user at the time the post was made, identifiers provided by the OSN, and other information. Information contained in content or metadata of a social media post may show, for example, a record of a target identity's experience, presence at a place and time, as well as the target identity's sentiments or opinions about a concept as evidenced by overt expressions of feeling, emotion, or approval, such as through descriptive text in posts, comments to the posts of others, or "likes" of others' postings. Relationships embedded in OSN metadata may indicate the target identity's relationships with others (e.g., "friends") who are familiar with the target identity's character, habits, or other matters.

Every individual search result across the entire panoply of element sources may possess any of a number of such attributes, or "facets," any of which may be pertinent to constructing a future virtual experience. Techniques and systems described herein advantageously provide technical methods for the extraction and separation of these facets from the base content returned from element sources, thus transforming content and metadata from the technical form usually returned from an element source (e.g., JSON, XML, HTML, images, video files, document files, and other proprietary formats) into discrete content elements that can be individually and separately used to construct a facet-segmented repository (and, ultimately, a bespoke virtual experience container).

"Facetization" is a term used herein to refer to deconstructing the search results into discrete content elements classified in accordance with a schema of element facets. In facetization, data entities returned as search results from various element sources are analyzed for their content and meta-content. The results of the analysis allow the content and meta-content to be separated into discrete content elements which are classified by populating a data structure arranged according to a schema of element facets, some or all of which schema may be pre-defined.

An extended example of facetization of a single search result may be illustrative before more general processes are described: Mom posts a video on an OSN that was taken while Mom was sightseeing in Paris with her friend Jill. The video, taken by a consumer bodycam, contains footage of the pair moving around Paris visiting such landmarks as the Louvre, the Eiffel Tower, and Notre Dame. Facetization, as described herein, takes this monolithic piece of content and meta-content, the video, and deconstructs it into discrete content elements with relevant and usable classifications defined by a schema of element facets. Thus, the video might be divided into one or more segments of content, each classified into one or more facets. For example, a video segment may be created of the approximately 35 minutes of footage of Mom and Jill visiting the Eiffel Tower. During facetization, that single content segment could be classified by the facets shown in Table 1.

TABLE 1

Facetization example

| Facet | Attribute |
|---|---|
| Primary Concept | Sightseeing at Eiffel Tower |
| Place | Eiffel Tower, |
| | Champ de Mars, |
| | Paris, France 75007, |
| | N48.85837° E2.29448° |
| Temporal | Jul. 24, 1998, 13:47-14:22 GMT |
| Environment | Weather: sunny, 35 degrees Celsius |
| Person Identity (1) | Mom |
| Emotion (1) | Happy |
| Person Identity (2) | Jill |
| Emotion (1) | Tired |
| Sentiment (1) | Annoyed |

Naturally, this example shows only a small sample of the numerous ways of creating discrete content elements and classifying the elements according to facet. Indeed, a more comprehensive understanding of a schema of element facets is contemplated and described below.

Figure 3:
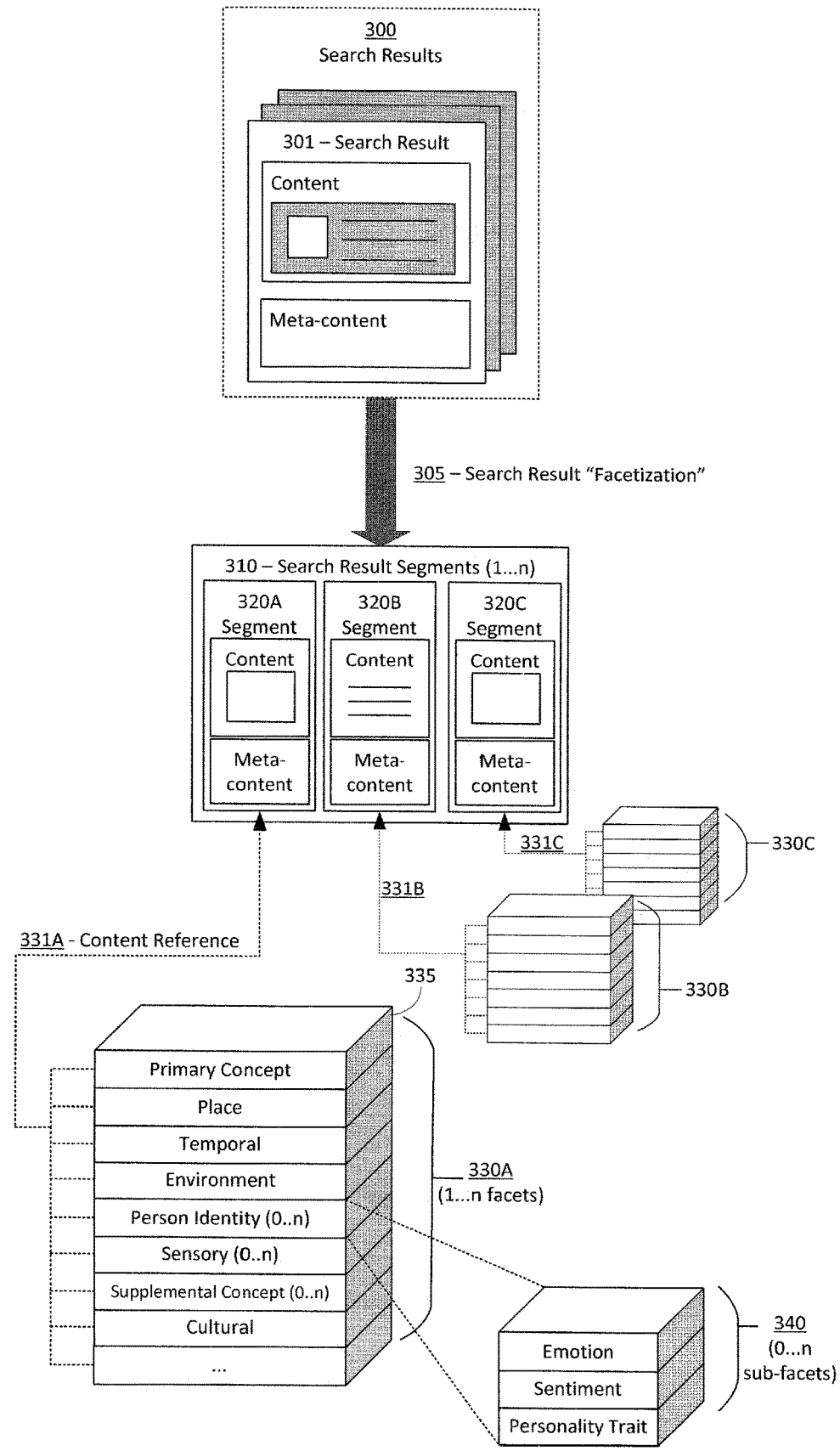
FIG. 3 shows an example representation of certain aspects of search results undergoing deconstruction/facetization techniques.

FIG. 3 shows an example representation of certain aspects of search results undergoing deconstruction/facetization techniques. Initially, one or more search results 300 are received from a search of a set of element sources (e.g., as described in 203). Search result 301 is representative, containing one or more kinds of content (e.g., text, images, video, sounds, etc.) as well as meta-content.

Search result facetization 305 occurs by analyzing, deconstructing, and classifying each individual search result associated with the search results 300. Analysis and deconstruction of the content and meta-content returned from searching divides the search results into a body of search result segments 310 containing one or more (1 . . . n) segments with content/meta-content, of which 320A, 320B, and 320C are representative. A segments may map to individual search results, standalone content or meta-content entities embedded in a search result, or sub-divided parts of a single piece of content (e.g., as in Mom's sightseeing video of Paris described previously). Different segments can also have overlapping (or even identical) content. Collectively, the analyzed and deconstructed form of search results 300 comprise the search result segments 310.

Each segment (e.g., 320A, 320B, and 320C) is classified by facet according to a schema of element facets. The "facet" data structure for each segment 320A, 320B, and 320C is represented in the figure by facet stacks 330A, 330B, and 330C. Each facet stack contains 1 . . . n facets classified according to a schema of element facets. Each facet (of which 335 is illustrative) maintains a content reference pointer 331A, 331B, and 331C that points to the segment which the facet describes an attribute of. The content reference pointer can reference the physical or logical location of a single content file, a set of multiple content files, a compound content file, a content file that embeds the desired content, a specific range in a content file (e.g., the range of video in a file from time location 1:00: 12.36 to 1:01:18:04), and/or a location in a database, data stream, or other data structure. Each facet (e.g., 335) in a facet stack may be considered a "discrete content element" that can be effectively used (and reused) to identify content for and assemble a custom virtual experience container for the beholder composed of many disparate content elements from many element sources. A facet-segmented repository is comprised of one or more facet stacks A schema of element facets contains a canonical structural organization for how discrete content elements are classified so that they can be used to construct the facet-segmented repository. The schema of element facets defines the relevant taxa in a taxonomy of classifications for content that are appropriate to building virtual experiences. Generally, the schema of element facets describes "facet types," each of which possesses various attributes. For example, "place" is a facet type in the schema which defines certain attributes that are used to describe, e.g., place name, street address, country, zip code, GPS coordinates, etc. To describe a specific place, the "place" facet type and its descriptive attributes are instantiated with data about the specific place associated with the content, e.g., "Eiffel Tower, Champ de Mars, Paris, France 75007, N48.85837° E2.29448°".

In some cases, one or more instantiations of any single facet (as represented by a type) can be associated with a content segment. For example, a given content segment may contain more than one instance of the "Person Identity" type when more than one person is identified in the content (e.g., Mom and Jill). Further, facet types may have sub-facets types. Sub-facet types can be applied to other facet types by applying the types hierarchically (e.g., using nested encoding), or by encoding additional attributes (beyond the content reference) that further specify associations between the sub-facet and the higher-level facet. An example of such "sub-facet" types are emotions, sentiments, and personality traits, which usually are associated with persons. Thus, 0 . . . n sub-facets which represent emotions, sentiments, and personality traits (e.g., 340) can be instantiated within or with reference to a person identity facet.

Certain facet types that may be relevant in a schema of element facets are discussed below, though it should be understood that this exemplary and illustrative, and is not intended to be comprehensive, complete, or otherwise limiting.

Primary and Supplemental Concept Facets. Concept facets contain attributes related to the topic or subject matter of content. As used herein, a "concept" can be a single word or multi-word phrase that describes a general classification of entity (e.g., "automobile", "passport", "children") or specifically named entity (e.g., a "Dodge Charger" automobile, "Tuberculosis"), person (e.g., "Jill"), place (e.g., "Eiffel Tower"), event (e.g., "Woodstock music festival, 1969", "wedding day"), or more abstract notion (e.g., "consumption", "marriage", "wealth"). A multi-word concept can also include a qualifying word such as an adjective (e.g., "broken leg") or qualifying phrase (e.g., "fishing boat" and "Parisians with berets"). A concept can also include a verb in its various forms, such as a verb phrase or verb-equivalent form (e.g., participle or gerundive), either alone or as a qualifier (e.g., "walk", "walking", "sightseeing in Paris", "barking dog", "church destroyed by a fire").

Concepts can be described at various levels of abstraction. For instance, the video clip in the prior example can be described variously (from more specific to more general) as "Mom and Jill looking out from atop the Eiffel Tower", "Two people sightseeing at the Eiffel Tower", or "Two people walking around Paris." The primary concept facet describes the major subject matter of the content. One or more supplemental concepts can be assigned to describe additional related concepts, including describing subject matter at more abstract or more specific levels of abstraction. For example, the video clip above might have a primary concept of "View from the Eiffel Tower" and a supplemental concept of "Mom and Jill's trip to Paris." Classifying discrete content elements by primary and supplemental concepts is an important aspect of targeting content for a virtual experience container that matches the subject matter prompt of the beholder's request. Methods of determining primary and supplemental concepts from search result content are discussed later herein.

Place Facet. The "place" facet contains attributes related to location. The place facet can denote one or more different kinds of location, including the place where the content was made (e.g., where the photo or video was taken), the place where the content happened (e.g., Grandad's blog post about World War II might describe Omaha Beach as the place), and the place from which the content was edited or shared. Places can be described, for example, by name, by address, longitude, latitude, map coordinates, astronomical coordinates, three-dimensional coordinates, and/or coordinates in a system such as GPS. The place facet can contain additional data, such as information about terrain, elevation, declination, and compass direction from a reference point. Places can be described more generally and/or with great accuracy, for example, Kenya, Paris, the Eiffel Tower, Normandy, Omaha Beach landing site, the house at 123 Elm Street, and latitude N48.85837° longitude E2.29448° (i.e., the Eiffel Tower's GPS coordinates). Places described speculatively or in fiction works may not have a true physical location (e.g., Narnia, Middle Earth, the planet Oberon). The place facet of a content segment may be determined by geolocation stamp or other meta-content associated with the content file or post, or it may be determined by various kinds of content analysis (described below) that identify known entities in text, images, and video.

Temporal Facet: The "temporal facet" describes attributes of time associated with content. A temporal facet may categorize or supplement content with time attributes that indicate, for example, the time coordinates of an event, such as a named event, epoch, era, or time-frame with which a content segment is associated (e.g., by naming the event itself or the larger event of which the content segment is part), the time length of a content segment, and/or the range of time depicted in a content segment, the time of recording of a content segment. Time length and range of time data can be represented with various degrees of accuracy and granularity (e.g., the day of the eclipse; the range of time the eclipse was visible at a particular geolocation; the time, in seconds, recorded by a particular content segment of the eclipse). Temporal facet attributes associated with named events, epochs, eras, or time-frames can also be represented with various degrees of granularity and may overlap; for example, the "battle of Guadalcanal" is a more granular named event than "World War II," though both are descriptive and appropriate.

Environment Facet. The "environment facet" has attributes that describe ambient conditions associated with the content. These conditions can include the weather or aspects thereof (e.g., temperature, humidity, heat index, wind speed/gust, raining, snowing, foggy, sunny, partially cloudy, smog index, pollen count), astronomical conditions (tides, sunrise/sunset times, cycles of the Moon, positioning of stars/constellations or planets), astrological conditions (e.g., year of the Chinese Zodiac, astrological era such as "the Age of Aquarius" or "Mercury retrograde"). An environmental facet can also describe the "mood" of content as designated by one or more descriptive adjectives (e.g., gloomy, dark, depressing, cheery, vibrant, smoky, dim, etc.). Attribute descriptors for the environment facet can sometimes be determined by extracting additional information from element sources based on information about the content segment present in other content/meta-content or facets. For example, the place facet and the temporal facet may be utilized to lookup up environmental facet attributes by obtaining historical weather conditions from element sources/information feeds such as online weather databases. In some cases, attribute descriptors for the environment facet can be obtained by various kinds of content analysis to identify entities or properties of text, image, and video content.

Person Identity Facet: The "person identity facet" describes attributes of people, personality, or organizations/legal entities associated with the content or meta-content. A person identity facet can designate any of the types of person or entity described as a target identity or selected target identity in regard to FIG. 1. The person identity facet can designate primary actors in the content, such as a target identity (e.g., "Mom"), selected entity, or beholder. The person identity facet can also designate supplemental actors identified in the content or meta-content of search results, including both known (e.g., "Jill") and unknown (e.g., "Male tourist, brown hair, 25-35 years old) actors. Attributes of the person identity facet can include the aspects described in FIG. 1 as elements of a designator data structure for target identities or selected target identities, such as name, biographical information (e.g., birthdate and place), age, body dimensions (e.g., hair color, height, weight, eye color), race, ethnicity, religion, ancestry, occupation, address, telephone numbers, a photo, demographic data, biometric data (e.g., facial or body part recognition data, fingerprints), all or part of the person's genome, or other kinds of information. Attributes of the person identity facet can also include, for example, logins, account numbers, user ids, or handles on online accounts, email addresses, and optionally, login credentials (e.g., user id/password combinations, biometric data, identity tokens, authorization tokens allowing access to the content of the target identity) for a multiplicity of accounts, both locally and in the cloud. The aforementioned attributes are not intended to be limiting. Person identity facets can have zero or more sub-facet types, including emotion, sentiment, and personality trait sub-facets; each sub-facet type can have one or more instances of that type.

Emotion and Sentiment Facets. The "emotion facet" and the "sentiment facet" are sub-facet types of a person identity facet, as emotions and sentiments are generally characteristics of person identities. A person identity facet may have 0 . . . n emotion facets and 0 . . . n sentiment facets associated with a particular content segment. Emotions generally describe a nominalized state of being at a point in time and may or may not be associated with a particular concept associated with a content segment. For example, a person identity can express "joy" or "sadness" (emotions), as described by the emotion facet, and a content segment might depict that person identity (e.g., on video and/or audio) expressing that emotion. Or, an expression of emotion may be unrelated to the content segment. Sentiments generally describe feelings directed at a specific "concept" as represented by a specific content segment, such as an event, relationship, or place (e.g., a primary concept or supplemental concept). For example, a person identity can express "disgust" (a sentiment) while trying the delicacy "foie gras".

Techniques for automating the determination of emotions and sentiments of person identities from content are discussed below. A discrete content element classified under an emotion or sentiment facet might be used, for example, to provide accurate visual representations in a virtual avatar when a matching emotion is being experienced, or to understand/represent a target identity's tone in relation to a certain conversational topic.

Personality Trait Facet. The "personality trait" facet is a sub-facet type of a person identity facet, as personality traits are characteristics of person identities. A person identity facet may have 0 . . . n personality trait facets. Unlike emotion and sentiment facets, which may be associated with particular content segments related to the emotion/sentiment, personality traits may be primarily associated with the person identity. Personality traits may also be personality disorders. Personality trait facet attribute values may align with an externally-recognized taxonomy of personality traits/disorders, such as the Diagnostic and Statistical Manual of Mental Disorders (e.g., the DSM-5), or the "Big Five" Trait Taxonomy. For example, the Big Five Trait Taxonomy puts forth an OCEAN model of personality dimensions characterized by the following: E—Extraversion, Energy, Enthusiasm (I); A—Agreeableness, Altruism, Affection (II); C—Conscientiousness, Control, Constraint (III); N—Neuroticism, Negative Affectivity, Nervousness (IV); O—Openness, Originality, Open-mindedness (V). In some cases, the personality trait attribute values may be derived from a weighted (or non-weighted) set of attributes taken from emotion and sentiment indications in the totality of a person identity's content repositories. A personality trait-faceted discrete content element might be used, for example, to provide consistent and realistic behavioral representations in a virtual avatar of a target identity, or to understand/represent a target identity's tone or interests in conversation with a chatbot representing the target identity.

Sensory Facet. The "sensory facet" describes/classifies the sensory mode depicted in an associated content segment. Attributes of the sensory facet classify important sensory and/or dimensional aspects of content so that discrete content elements can be matched to user experience device capabilities during virtual experience container assembly. For example, a sensory facet might categorize a content segment using one or more attributes such as "3D video" associated with a content segment with a primary concept of "Louvre, the Old Masters gallery room), "2D video" with a resolution of "1600×900" in a "16:9" aspect ratio, and "audio, 3 seconds in length" associated with a content segment with a primary concept of "train whistle". The aforementioned are merely examples. A discrete content element classified in a sensory facet might be used, for example, to provide an appropriate sensory-effect in a virtual experience container.

Cultural Facet: The "cultural facet" contains attributes which classify or relate to cultural characteristics associated with the content. Cultural characteristics are often associated with an era or epoch, such as a time in history. The cultural facet may be used to categorize or supplement content with, as non-limiting examples, styles of dress, fashion, jewelry, political opinions and conditions, entertainment preferences, decorating and home décor styles, and even ways of speaking and gesturing. For instance, in 1950s America, men often wore Porkpie hats, kitchen appliances were commonly yellow or coppertone brown, and early Rock 'n' Roll was popular. A discrete content element in the cultural facet might be used, for example, to provide era-specific and period-realistic detail (e.g., information or content) relating to a virtual experience of an era; for example, a virtual experience having a virtual avatar of Grandma in the 50's might depict her in her kitchen (with appropriately-colored yellow appliances), wearing a brooch in a popular style; or, an indicator or overlay might use information attributes in the cultural facet to provide content to a beholder about a cultural artifact shown in the content (e.g., during virtual experience playback/review).

A number of different kinds of data structures are capable of embodying the constitutive types of a schema of element facets. Structurally, various Extended Markup Language (XML) schemas can be used to define data types and their attributes for the facet types in the schema of element facets. Relational databases can also be used. Types, subsets of types, and attributes obtained from standardized schemas for structured data, such as those available at "schema.org" can be used to define the facet type taxa. For example, types exist on schema.org with rich sets of attributes for Person, Place, Event, Organization, and certain other relevant types.

It is notable that many implementations of data structures for representing facets of search result segments are possible. The types and data content of facets associated with a content element may be structurally represented in many different text encodings and/or markup tag semantics (e.g., RDFa, Microdata, XML, and JSON-LD). These text encodings can be stored in relation with or linkage to the content reference pointer. In some cases, all or part of the encodings of facets of a content segment represented by a single content reference pointer may be stored together in the same storage unit, such as a file or database entry in a relational database system.

Facetization of a search result initiates with analyzing and interpreting the search result's content and meta-content. Analysis of a search result is performed (e.g., by a virtual experience service 120 in conjunction with an interpretation service 130) to assess and interpret its content and meta-content for assignment into discrete content elements by facet type. Analyzing a search result may be performed using several semantic analysis methods, which may differ according to the types of content and meta-content present in the search result and the facet type being determined. Although the kinds of semantic analysis techniques described are intended to be exemplary, not limiting, they are approximately related to the type of content/meta-content and can be grouped generally into textual analysis, image analysis, voice analysis, sentiment/emotion analysis, personality trait analysis, relationship analysis, sensory analysis, geolocation determination, and temporal analysis. More than one group of analysis techniques may be used to assess and interpret certain facet types and/or content/meta-content types.

With respect to the analysis of textual matter, several techniques may be used alone or in combination. In some cases, tf-idf techniques may be used. The tf-idf is a numerical statistic that serves as a metric reflecting how important a word is in a body of text such as a document, social media post, or other writing. The tf-idf value increases in proportion to the number of times a term (e.g., a word or phrase) appears in a body of text; this value can also be negatively weighted to control for the fact that some terms are more common than others. The tf-idf value can assist in identifying and ranking the major subject matter terms in a body of text, for example, for determining primary and supplementary concept facets.

Some implementations may use Latent Semantic Indexing (LSI) to identify concepts in search results by text categorization. Text categorization is the assignment of textual matter to one or more predefined categories based on its similarity to the conceptual content of the categories. LSI may be applied to establish a conceptual basis for each category using canonical examples of text or documents. During text categorization, the concepts contained in the content being categorized (i.e., the search results) is compared to the concepts contained in the examples, and conceptual categories are assigned based on similarities between the concepts in the examples and the concepts in the search results. The identified conceptual categories may be used, for example, for determining primary and supplementary concept facets.

Certain instantiations of a virtual experience service may utilize one or more language understanding services to enhance concept analysis. Different kinds of language understanding service may be provided by a third-party service provider such as Microsoft Azure®, Amazon® Web Services, or Google®, for example via an API of the language understanding service. These services can accept a range of text from a calling process/application (e.g., the virtual experience service) and return a result of the analysis to the caller.

In some cases, a language understanding service that identifies and disambiguates entities in text, such as the Entity Linking Intelligence Service (from Microsoft Azure), may be used to recognize and identify each separate named entity in the text sent by a caller (e.g., the virtual experience system/service). For example, suppose that a beholder wants to see an virtual experience about a target identity's (e.g., Mom's) trip to Paris. The target identity has often written one or more social media posts, blog posts, or emails that contain narratives recounting or describing a series of events, impressions, or other details about the trip. These narratives describe key concepts such as people and places that form the cornerstone concepts of the "Mom's trip to Paris" virtual experience. For example, consider the following short narrative from Mom's email to her son: "On Thursday, Jill and I started out so early that we were able to see the Basilica of the Sacre-Coeur on Montmartre at sunrise." If submitted to an entity identification service, the service can return a structured result that enumerates key entities that may be focal concepts: "Basilica of the Sacre-Coeur," "Montmartre," "sunrise," "Thursday," and "Jill." These techniques may be used, for example, for determining primary and supplementary concept facets.

Other kinds of text analytics can detect or translate language, as well as detect sentiment, key phrases, and topics from the text. The Text Analytics API (again from Microsoft Azure) accepts input text from a calling application and returns a range of text characteristics. For example, the prior example about Mom's trip to Paris, if submitted to a text analytics service, could identify the language as English with 100% confidence, score the sentiment at 50% in terms of its positivity, and enumerate the key phrases as including "Sacre-Coeur, Basilica, Montmartre, sunrise, Jill."

Still other semantic processing services can determine the structure of text by performing operations such as sentence separation and tokenization, part-of-speech tagging (e.g., entities, persons, places, things), and constituency parsing to identify key phrases and see the associated modifiers and predicates. An example of such a service is the Linguistic Analysis API from Microsoft Azure.

To improve the understanding of key concepts in textual matter, some implementations may use deep linguistic analysis to comprehend compositionality in the text (i.e., the way the sematic orientation of text as a whole is determined by the combined semantic orientations of constituent phrases). A discourse analysis method, such as Rhetorical Structure Theory (RST), can separate textual matter into a hierarchical rhetorical structure of segments. The segments are either nuclei, which carry the core semantic content of the text, or satellites, which tend to be qualifiers of nuclei such as text that elaborates on or contrasts with the nucleus text (numerous types of segment relations, called "relation labels," are defined). Tools built on RST, such as SPADE (Sentence-level Parsing of Discourse) create an RST tree for each sentence. Another tool, HILDA (High-Level Discourse Analyzer), parses at the document level using a bottom-up tree-building method. Using machine learning, HILDA iteratively assigns relation labels to the most-related segments and returns a formal representation of the text and its rhetorical structure. Some implementations performing contextual or search result content analysis as described herein may use an understanding of the classification of text segments on the base level as either nuclei or satellites, further informed in some cases by the relations between segments, to discover or rank content elements for inclusion in a virtual experience.

Different semantic analysis methods may yield a different selection of key concepts in the search results, as some methods may be more effective with certain kinds of textual material than others. Hence, more than one kind of semantic analysis method may be used to determine key concepts. When more than one kind of semantic analysis is used, primary and supplementary concepts may be assigned to a discrete content element, for instance, from a union or intersection of the key concepts yielded by each analysis method; from a calculation of a proportion of the methods yielding the key concept; or by calculating a weighted average of the score or rank assigned by each semantic analysis method to a concept.

In many cases, the search results will return content containing images. These images may contain relevant content elements in themselves, or they may be used as patterns for locating similar images among the search results or in subsequent queries to the element sources. An image may express a variety of different subject matter on a number of conceptual levels, and any or all of the levels may be useful for deriving content elements for the virtual experience.

One kind of analysis involves facial or object recognition in images, wherein automated methods are used to classify one or more aspects of the subject matter of an image. Consider, for example, a social media posting of a photo from Mom's trip to Paris which might be described as "Mom sitting at a table in Café du Monde with Jill and an unknown man." When returned by an element source in response to a search, automated analysis methods may classify the subject matter of the image content in one or more ways: (1) the overall topical subject of an image (e.g., "three people sitting in a café"); (2) particular people depicted in the image (e.g., "Mom, Jill Johnson, and an unknown third man"); (3) a setting for the image (e.g., "a café"); (4) a list of recognizable objects in the image (e.g., two women and a man, a table, three coffee cups, and a sign that says "Café du Monde").

To assist the automated methods in discerning the aspects of an image at an appropriate conceptual level, some implementations may include user interaction features and elements that allow a beholder to select one or more parts of an image for analysis, such as a particular face or person in the image, the location of the image, an object in the image, or an overall scene or topical description. Interaction features can include methods of selecting areas of interest in the visual field of the image using, for example, a finger on a touchscreen or other pointing tool to highlight or outline a relevant area of the image. Other interaction features may allow a beholder to indicate the conceptual level for analysis along a continuum ranging from the concept describing the overall scene to the identity of every person and discernable item in the image and their spatial relationships. Such interaction features may be provided to the beholder on the user experience device via a beholder request component or (experience delivery component). In some implementations, interaction techniques may be provided which allow advance curation of certain content on an element source or pre-curation of the beholder-provided content being uploaded in connection with a subject matter prompt.

In some use cases, a target identity, beholder, or an automated agent of an online service or application has captioned an image with text describing the image's subject matter, for example using a captioning tool provided by a social networking service. In such cases, key concepts can be extracted from the text of the caption using language analysis features previously described. A user of an OSN (or other service) may also have used tags or other interaction motifs to pre-indicate the identity of a person or place associated with the image. The pre-indicated identity of the person(s) or place(s) in the image may be extracted from the service's (e.g., the OSN's) metadata without the need for deeper image analysis.

Certain instantiations of a virtual experience service may enhance image analysis in various ways using one or more kinds of machine learning-based image interpretation services. Different kinds of image interpretation services may be provided by a third-party service provider such as Microsoft Azure®, Amazon® Web Services, or Google®, for example via an API of the image interpretation service. These services can accept an image (and any indicated selection) from a calling application (e.g., the virtual experience service 120) and return a result of the image concept analysis to the caller.

In some cases, techniques can be used to train custom image classifiers that are used to find similar image content among content elements from the search results. Implementations herein can place canonical training images (e.g., of a person, place, or object) that have been pre-tagged with concepts pertaining to the subject matter context into a repository of images to build a custom classifier image set. A custom image classifier service, via its API, is then directed to train itself to recognize similar subject matter in other images. The trained custom image classifier is then used as one instance of a search module that can be queried by the virtual experience service, directing the trained image classifier to review the search results from element sources and return images that have the same conceptual identity as defined by the custom image classifier. Some third parties, such as the Microsoft Custom Vision Service, may provide custom image classifier capability as a service accessible via an API.

These techniques can use a custom image classifier to characterize the conceptual level of desired content at varying levels of granularity. For instance, images provided to train the custom image classifier can be used at a very granular level to define concepts of interest in a specific situation, such as a "Mom and Jill's trip to Paris." In such cases, an image of Mom and Jill at Sacre-Coeur might be sent to the classifier tagged with the concept of "Mom and Jill at Sacre-Coeur, Paris." Analogously, concepts pertaining to "Parisian landmarks" might be represented at a much higher level of granularity, with canonical images of prominent places in Paris (e.g., obtained from information feeds about Paris) being used to train a custom image classifier on that general concept. This trained classifier could be used to locate similar photos taken by Mom or Jill when searching through their target identity content repositories. Using these techniques, images pertaining to the broader concept could be used to direct a search query to find other content.

Some image interpretation services may be able to identify the subject matter of content in images without a custom image classifier. Third parties, such as the Microsoft Computer Vision API, may provide such capabilities as a service accessible via an API. Analysis of image subject matter may be performed by sending an image, via the service API, for content classification. Image subject matter characteristics on various levels of granularity are extracted from the visual content of the image and returned along with confidence levels indicating the service's confidence in a match. For instance, if a photo of a person sitting under a tree petting a dog is submitted to the Microsoft Computer Vision API, it returns "a person petting a dog" as the image caption (0.497 confidence), along with the concepts "person" (0.996 confidence), "outdoors" (0.995 confidence), and "petting" (0.619 confidence). The gender and age of faces in the photo are also returned (e.g., "male, age 31"). These subject matter concepts present in the image, along with their confidence score, may be used to identify and assess concept for facetization into discrete content elements.

Image interpretation services can also identify text embedded in images, such as captions embedded on the image and images of handwritten or scanned material, using optical character recognition technologies. This text material can then be analyzed using text analysis techniques described above to determine and assess discrete content elements for the facet-segmented repository.

The identity of subject matter in images relating to specific people or places may be determined with an image interpretation service that recognizes faces or places. A selection of images containing people or places to be identified are submitted to the image recognition service, which returns a proper name or equivalent identifier denoting the specific persons or places represented. These identifiers (i.e., image-concepts) are used to determine one or more content elements. Image recognition services may be available from third parties, accessible via an API—for example, the person and landmark recognition service available with the Microsoft Computer Vision API described above.

Other image interpretation services may automatically caption images with text that can be used to identify the images' primary and secondary concept facet types. Many such image interpretation services are based on trained AI classifiers that attempt to determine a single predominant word to describe the image, and then use that word to predict others based on word N-gram probability information. Alternatively, more recent captioning techniques use image-to-phrase vectoring comparisons to select the most likely noun, verb, and propositional phrases [see, e.g., Remi Lebret, Pedro O. Pinheiro, Ronan Collobert, "Phrase-Based Image Captioning," ICML 2015, which is incorporated herein by reference]. These techniques allow an image interpretation service to caption images that may never have been learned by a classifier before, and to caption images without repeatedly recycling previous captions. These techniques may also, advantageously, pre-analyze the caption into part-of-speech constructs more readily digestible as primary and secondary concept facet types, or as geolocation or relationship identity facets.

Video and spoken content may also be analyzed to assist in determining discrete content elements relating to the subject matter context. Video and speech interpretation services may be used, for instance, to directly extract primary or supplementary concepts or other facets from the search results, or as a preliminary stage or post-processing stage in concert with image interpretation or language interpretation analysis. Any or all of these services may be available from third party platform providers such as Microsoft Azure, accessible via an API.

In a video or audio recording, for example, speech recognition services may be used to understand spoken words and transmute them into their written form for language interpretation analysis. Translation services may pre-translate foreign language speech before submitting the translated text for language interpretation analysis.

In some implementations, speaker recognition services can be used to determine whether the identity of a speaker in a voice recording matches the identity of a known sample. Pre-collected samples of known speakers (e.g., of target persons or important auxiliary persons), for example, can be submitted as part of the beholder-provided content. A custom search module (speech classifier) is formed when a speaker recognition service is called to return search results with content elements where a speaker's voice matches one of the pre-collected samples.

Video analysis services may also be used to perform useful search result analysis and classification functions. Some implementations may interact with a service that can detect and track faces in video, such as the Microsoft Video API. For instance, content containing a video is submitted to the service via the API, which returns an enumeration of distinct faces along with their timing coordinates and their location/size dimensions on the two-dimensional plane of the video. Still images of each distinct face (which may include one or more samples taken from different time coordinates) can then be extracted from the video and used to identify the faces or to drive searches of other content in accordance with techniques previously described (e.g., facial recognition, custom image classifier training, etc.). Further, a selection of video content where the desired target identities are present can then be extracted from the larger video item and used as a discrete content element in facet-segmented repository.

Implementations may also use a video indexing service, such as the Microsoft Video Indexer, to analyze one or more aspects of a video, including image and spoken content. A video is submitted to the indexing service, which may extract and return several keywords (optionally, along with timing coordinates) from the spoken or embedded written content that indicate predominant subject matter topics. These topics can then be processed to determine their membership in the taxonomy of content elements by alignment with the beholder request. Speaker indexing can assign a speaker identity to the words the speaker spoke and the time they were spoken. The spoken words and the speaker's identity can be added to the discrete content elements in the facet-segmented repository.

To support facetization of audio content, some implementations may also use techniques for determining the primary or supplemental concept facet of content segments containing audio content. Techniques may be used for summarizing the conceptual content of a large audio corpus, such as all of a target identity's available spoken content. In one technique, for example, probabilistic latent semantic analysis may be used to learn a set of latent topics without supervision. These latent topics are ranked by their relative importance in the corpus and a summary of each topic is generated from signature words that describe the content of that topic (See, e.g., T. J. Hazen, "Latent Topic Modeling for Audio Corpus Summarization," Interspeech 2011, available at http://people.csail.mitedu/hazen/publications/Hazen-Interspeech11.pdf, which is herein incorporated by reference).

In some embodiments, sentiment analysis of content may be beneficial to determining and classifying discrete content elements. For instance, when analysis of search results is performed (e.g., as described above), sentiments about the content may be derived at the same time. Sentiment analysis may be used to characterize the attitude of a target identity toward the subject matter/concept of the post or content. Operatively, sentiments can be designated by assigning sentiment qualifiers to different aspects of content elements to form discrete content elements that can be classified in accordance with their sentiment facet, such as when sentiments are used to qualify a primary or secondary concept facet with an additional sentiment-oriented qualifier.

Sentiment facets may be used for building virtual experiences in various ways. The sentiment facet may be used to select or deselect content elements for a virtual experience container based on a subject matter prompt (e.g., when the subject matter prompt requests content relating to a difficult time in a Mom's life or examples of times Mom was "angry"). Sentiment facets may be also used to provide additional content for a virtual experience container reflective of the mood or attitude of the target identity toward similar events (e.g., retrieve content showing "how does Mom feel about snakes?"). Sentiment facets may also be used as supplemental information relevant to analyzing and constructing personality trait facets for a person identity.

Determining the sentiment of a person (e.g., a target identity) toward content can be performed using a variety of methods. Sometimes, the sentiment of the target identity is expressed directly by the behaviors of that person on a third-party platform such as an OSN. For example, many OSNs have "like" buttons whereby a person can express a feeling of "liking" another's post content. Other social networks allow a user to express a wider range of sentiments about content (e.g., FACEBOOK's "reaction buttons" allow "like," "love," "haha," "wow," "sad," and "angry" sentiments to be expressed by users). Since many users interact with OSNs and other content networks mainly by expressing sentiment about others' postings of content, rather than by posting original content, analysis of the target identity's sentiments toward others' content may be a rich source of sentiment facets for discrete content elements. Many social networks also allow their users to comment on the content of others (e.g., during a repost or reply interaction) with text that may express the sentiment of the user toward the original content. Sentiments directly expressed by users using interaction features of a social network are sometimes stored as distinct metadata by the social network and are therefore straightforwardly indexed attributes of content returned in search results.

The sentiment of a target identity toward some kinds of content is indicated by an emoticon symbol or sentiment-indicating acronym embedded in the stream of content or associated with the content, e.g., in a tag or caption. For example, textual matter composed by the target identity such as texts, emails, blog entries, and forum postings often contain emoticon symbols or acronyms that express the sentiment/emotion of the target identity toward the content or indicate how the target identity was feeling at the time of composition. A smiley face or frowning face emoticon symbol might be used to indicate happiness or sadness about the described occurrence or content, and/or an acronym such as "LOL" can be used to show amusement or "OMG" can be used to show surprise. Generally, emoticons and acronyms are used to express a single sentiment, but sometimes they have a few possible meanings. Emoticons are typically indicated by standard Unicode value codes, and acronyms are generally short, definitive strings of characters. Both types can be read from text using standardized text matching techniques. Their values can then be compared via a meaning lookup table to determine the sentiment (or the possible sentiments within a range of meanings) being expressed.

The sentiment of textual content (e.g., original textual content or textual commentary on other content) can sometimes be determined using language analysis techniques. Some of those techniques may use existing platform services (e.g., available from Microsoft Azure) to determine the sentiment of text. Other techniques may use compositional analysis to determine sentiment using satellite segments associated with key nuclei concepts (see above).

The sentiments or emotions of persons in image content can be determined using automated image processing techniques. These capabilities may be available from a third-party platform, such as Microsoft's Emotion API, which receives an input image and returns a confidence score across a set of eight emotions (anger, contempt, disgust, fear, happiness, neutral, sadness, and surprise) for each human face in the image. In some implementations, such tools may be used to determine the sentiment attribute associated with the sentiment facet of content. For example, if Mom is photographed with a facial expression evidencing disgust while her friend Jill eats a huge triple-decker cheeseburger, a "negative" attribute sentiment facet may be associated with the image content toward the primary concept facet "cheeseburger" (or, more generally, "meat" or "gluttony").

Further, expressions of sarcasm about subject matter may change its relevance to the concept taxonomy. Sarcasm confuses sentiment analysis because textual cues describe a sentiment that is the opposite of the way the writer of the content actually feels. For example, if Mom (from the immediately prior example) also posted, along with the photo, "Y'all KNOW I just LOVE cheeseburgers!" the surface meaning of this text might be interpreted as expressing a positive sentiment toward the concept "cheeseburgers," though the impression given by the photo and the capitalization pattern suggests otherwise. To ameliorate the problems associated with sarcasm when performing sentiment facetization, some implementations may use a trained AI classifier that detects sarcasm in text (e.g., TrueRatr from Cornell University). In some implementations, expressions of contrasting sentiment, such those as obtained from social network metadata or facial expression analysis, may be used to signal sarcasm in text content. A result of sarcasm detection via one or more such techniques may be that the "sarcastic" contrary text indicators are disregarded altogether or counted as an additional instance of the opposite sentiment toward the content element.

Deconstructing the search results into discrete content elements via context analysis techniques described above and elsewhere herein produces a collection of content classified by facet. A facet-segmented repository is constructed that includes the discrete content elements (205). The facet-segmented repository may be associated with the designator data structure for the target identity. In some embodiments, constructing the facet-segmented repository may include further filtering using an element of the repository compilation request, such as the topical limiter, to select discrete content elements having primary concept and/or secondary concepts matching the topical limiter.

A facet-segmented repository may take one or more forms and may be implemented in one or more ways. In one form, a facet-segmented repository may be represented in a relational database managed using a relational database management system (RDBMS), such as a commercially available product like Microsoft SQLServer® or Apache®. The data structures forming the facet-segmented repository may include, for example, a table in which each row associates a content reference pointer referencing a specific content file/stream or segment of a content file/stream (e.g., 331A) with a designator data structure for the target identity and a facet reference pointer to a facet structure instance derived from a facet type from the schema of element facets and associated attributes. Facet structure instances may be stored in a separate table in which each row stores the facet reference pointer and facet attribute-value tuples. The content file/stream or content segment may be maintained in a file or document management system external to the RDBMS or embedded as a binary object in the RDBMS. Other forms of RDBMS-managed facet-segmented repository are possible.

In another form, a facet-segmented repository may be implemented using a collection of facet repository files containing a loosely-structured arrangement of attributes. For instance, each content file/stream may have one or more related facet repository file. Each facet repository file contains at least one facet type descriptor and attribute value pairs relating to the type that describe the facet, as well as a content reference pointer to the specific content file/stream or to a content segment thereof. Each facet type descriptor also has facet type attributes or subtypes appropriate to its facet type and values for the attributes/subtypes. A facet repository file may be implemented, for example, using languages or notations such as XML and JSON. Management and searching of facet repository files to retrieve content elements from the facet-segmented repository may be provided by database systems designed to manage and index collections of files containing loosely-structured data, such as NoSQL databases.

Any form of database or database management system (DBMS) utilized in any implementation herein may be provided through third party cloud services such as Microsoft Azure® or Amazon Web Services®. It should be noted that the techniques and systems described herein for structuring and storing a facet-segmented repository are intended to be exemplary and that other arrangements are possible. It should also be noted that the term "facet-segmented repository" may refer, depending on implementation, to a facet-segmented repository associated a particular target identity, content file/stream, content segment, or a collection of content file/streams or segments spanning one or more target identities or topical limiters.

The facet-segmented repository may be stored on a computer-readable storage media of the system/service (206). The form of storing the facet-segmented repository may vary according to implementation methods, described above, such as the type of RDBMS, NoSQL, or file storage mechanism. When a cloud-based service is utilized for a DBMS, the computer-readable storage media at the cloud service is considered part of the computer-readable storage media of the system/service. An advantageous technical effect of the stored facet-segmented repository is that content relating to a target identity in any given search result can be deconstructed and stored in facets so that it may be used to rapidly build bespoke virtual experience containers with greater processing efficiency, lower user wait time, and decreased overall storage costs. Processor load on external systems and network traffic may also be reduced, as searches for particular kinds of content may be executed less frequently (or only once) against a given element source.

In some operating conditions, deconstruction and classification of discrete content elements acquired during an initial search of a set of element sources may indicate that information is missing from the facet-segmented repository that may be useful for assembling a virtual experience. For instance, these information gaps may take the form of missing content, a missing facet type, or missing facet attribute (i.e., missing information in attribute-value pairs associated with a facet type). Accordingly, in some embodiments, constructing the facet-segmented repository may include iteratively performing certain techniques for identifying and acquiring new (or modifying existing) discrete content elements or other supplemental information to supplement existing content.

Figure 2B:
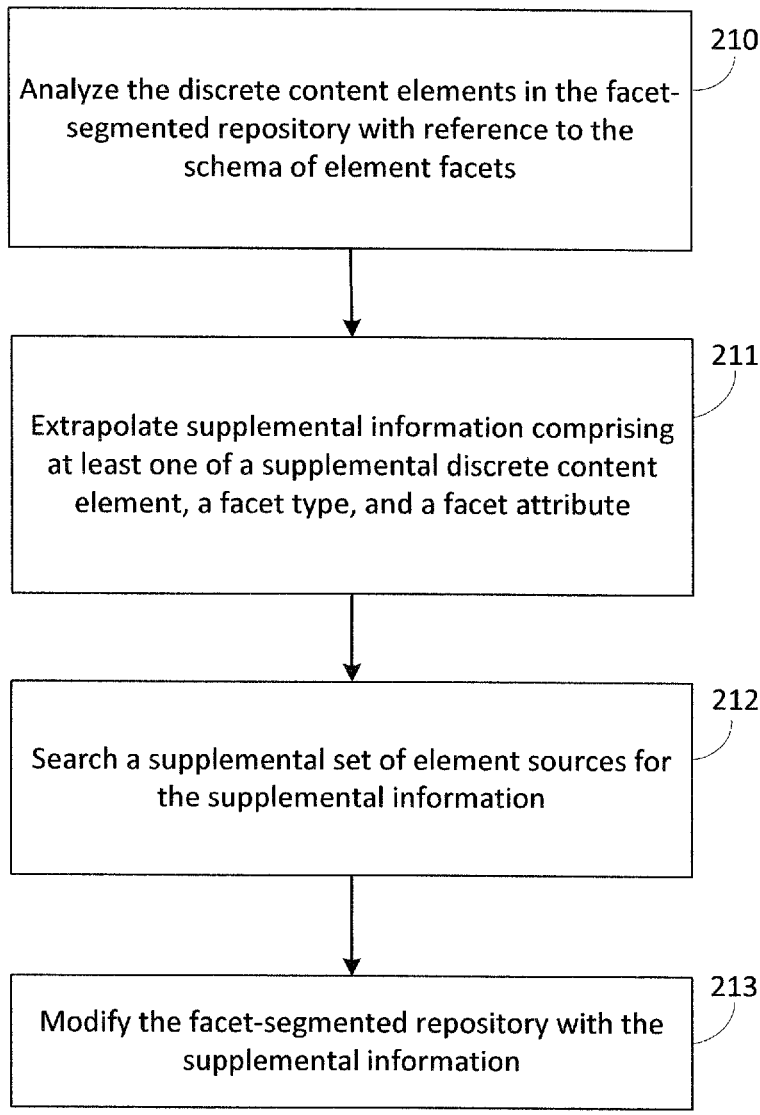
FIG. 2B depicts an example process flow for supplementing a facet-segmented repository with supplemental information.

FIG. 2B depicts an example process flow for supplementing a facet-segmented repository with supplemental information. Initially, the discrete content elements in the facet-segmented repository may be analyzed with reference to the schema of element facets (210). An advantageous technical effect of the facet-segmented repository structure is that holes or gaps in information may be efficiently identified by using processing and searching methods targeted at data structures such as relational databases and XML. In an implementation of a facet-segmented repository using an RDBMS, for example, queries may be executed against a facet-segmented repository to check for missing content elements, facet types, or facet attributes. In an XML-based implementation of a facet-segmented repository, XML Schemas may be used to define a canonical structure for a facet-segmented repository that includes facet types and their mandatory and optional attributes. Validation functions of XML may be used in conjunction with these XML Schemas (described, for example, in an XSD file) to verify an XML-implemented facet repository file associated with a content file/stream or content segment for consistency with the XML Schema's canonical structure.

Supplemental information including missing content, missing facet types relating to content, and missing mandatory or optional facet attributes may be extrapolated from the analysis of the facet-segmented repository (211). As one example scenario, suppose that a repository compilation request targets content related to Mom and Jill's visit to the Louvre in Paris. However, because video recording of the Mona Lisa by tourists is prohibited, there is no content having video of the Mona Lisa in the facet-segmented repository. Analysis of the facet-segmented repository reveals a lack of content with the primary concept facet of "Mona Lisa." Therefore, it may be extrapolated that supplemental content may need to be searched for on element sources such as the Louvre's website. As another instance, suppose that analysis of the facet-segmented repository reveals that an environmental facet is not present in the facet-segmented repository for a certain content segment; for example, if an initial deconstruction of footage from Mom and Jill's sightseeing video into facets is unable to determine the weather conditions at the time (e.g., whether it is cloudy, raining, sunny, warm, etc.), the supplemental information might include obtaining weather attributes of the environmental facet from an element source such as a historical weather data website. As another example, suppose that certain mandatory or optional facet attributes are lacking in a particular facet, such as GPS location coordinates in the Place facet or moon phase in the Environment facet. These facet attributes may be extrapolated as supplemental information which can be located via supplemental searches of element sources.

The supplemental set of element sources are searched for the supplemental information (212). Searching for the supplemental information on a supplemental set of element sources may be performed similarly to that described in FIG. 2A with respect to an initial determination of query terms, sending a search, and receiving search results. It should be noted, however, that a supplemental set of element sources may contain some of, all of, or different element sources from those in the original set of element sources of FIG. 2A.

The facet-segmented repository may be modified with the supplemental information (213). Depending on the nature of the supplemental information being searched for, the modification of the facet-segmented repository may occur in various ways. If a supplemental discrete content element is being searched for, search results relating to the supplemental discrete content element may be processed using techniques similar to or identical to those described with respect to deconstruction and facetization operations in FIG. 2A. Modifying the facet-segmented repository may, for example, include adding a new content file/stream or segment, a content reference pointer thereto, and inserting facet-related data in an RDBMS or in one or more facet repository files in association with the content reference pointer. If a supplemental facet type for an existing content segment is determined, modifying the facet-segmented repository may, for example, include inserting facet-related data in an RDBMS or in one or more facet repository files in association with the content reference pointer of the existing content segment. If the supplemental information includes a facet attribute for an existing content segment, modifying the facet-segmented repository may, for example, include inserting or supplementing facet attribute data for an existing facet stored in an RDBMS or in one or more facet repository files in association with the content reference pointer of the existing content segment. Any or all of the ways of modification may be used, depending on the nature of the supplemental information being sought in a given request instance.

An advantageous technical effect of the technical features described with respect to FIG. 2B is that virtual experiences can be created that overcome informational and quality shortcomings in content that was gathered at the time of the event or life experience occurred. Existing digital content can be enhanced or improved using the described supplementation techniques, leading to a richer and higher quality beholder experience of content than can be provided by existing technical methods for storage and playback of digital content.

It should be noted that a supplemental discrete content element, facet type, and/or facet attribute can be obtained from any element source 140, including information feed(s) 141 and target identity content repositories 142. A facet type can include any type of facet, such as a primary concept, place, temporal, environment, person identity, sensory, supplemental concept, cultural, emotion, sentiment, or personality trait.

A facet-segmented repository may be used to construct a virtual experience container. To summarize, deconstructing the search results into discrete content elements produces a collection of content classified by facet in a facet-segmented repository. A feature of the discrete content elements produced by facetization is that the discrete content elements can be used in their "facetized" form to construct virtual experiences that are highly targeted as to subject matter and rich in informational, sensory, and dimensional elements. This technical feature has the advantageous technical effect of allowing content to be (1) reused across multiple subject matter prompts and (2) supplemented from external element sources. These effects allow production of a virtual experience relating to a subject matter prompt that may have more content, or improved quality content, than the content gathered at the time of the real experience. For instance, a virtual experience of Mom and Jill's trip to Paris could contain content, such as the view from atop the Eiffel Tower, that is supplemented from other element sources if certain content segments or dimensions were not able to be gathered during the "real" experience, such as if the top of the Eiffel Tower was too crowded to allow Mom to pull out her camera to record video.

Figure 4A:
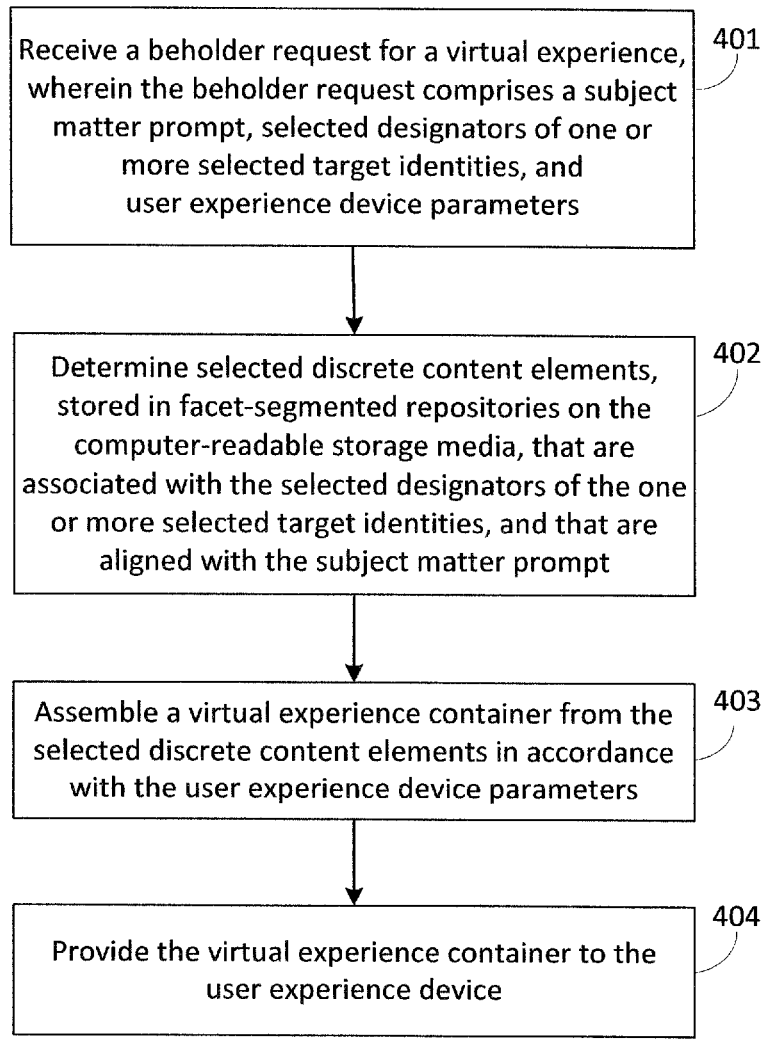
FIG. 4A shows an example process flow that may be implemented by a system or service that constructs a virtual experience container for rendering a multi-faceted and flexibly-dimensioned virtual experience of target identities that is matched to the capabilities of a user experience device.

FIG. 4A shows an example process flow that may be implemented by a system or service that constructs a virtual experience container for rendering a multi-faceted and flexibly-dimensioned virtual experience of target identities that is matched to the capabilities of a user experience device.

Initially in FIG. 4A, a beholder request for a virtual experience is received from a user experience device (401). A beholder request is a software-based request received at a system or service that instructs the system or service to initiate construction of a virtual experience of one or more selected target identities on a user experience device. The beholder request communicates multiple, tangible data structures related to the subject matter desired in the virtual experience, the selected target identities from whose perspective the virtual experience is to be constructed, and the parameters and capabilities of the user experience device on which the virtual experience is to be experienced by the beholder. These varied aspects are described in concert with capabilities of various embodiments and examples below.

A beholder request may be initiated, generated, or modified in a variety of ways, including, but not limited to, as a result of a user's interaction with user interface elements of a user experience device, application, web site, or mobile device "app," as described in regard to FIG. 1 and FIG. 6. In certain implementations, the beholder request can also be generated via automated processes resulting from automated agents (of the service or other third-party services) executing periodically on a time schedule or in response to other triggering conditions. In some cases, the beholder request may be generated by an automated agent, or "bot," that acts autonomously based on a learned response from aggregate conditions, or from the past behaviors of a beholder, target identity, or other requestor. The beholder request may be received by a system/service implementing the process flow via, for example, a function call or API call to the service from a component on a user experience device or elsewhere.

A beholder request includes a subject matter prompt and user experience device parameters, aspects of which are discussed extensively in regard to FIG. 1 and FIG. 6. A beholder request may also include selected designators of one or more selected target identities. The selected target identities are those persons or other entities from whose perspective the virtual experience is to be constructed. A selected target identity may be an "identity" or "target identity," as described with respect to FIG. 1 and elsewhere. A selected target identity can be a target identity from a repository compilation request. A selected designator is a designator data structure (see, e.g., FIG. 1) for the selected target identity. Selected designators identify the one or more selected target identities. More than one selected designator can refer to more than one selected target identity in a beholder request.

Selected discrete content elements may be determined from facet-segmented repositories stored on the computer-readable storage media that are associated with the selected designators of the one or more selected target identities and that are aligned with the subject matter prompt (402). When a selected target identity is associated with a facet-segmented repository—as, for example, when the selected target identity has been a target identity in a repository compilation request—the selected discrete content elements may be determined from one or more facet-segmented repositories associated with the selected designator of the selected target identity. In some cases, a selected target identity may be an auxiliary identity associated with discrete content elements forming part of a facet-segmented repository associated with another identity; for example, the selected target identity may be associated with a "person identity" facet (see, e.g., FIG. 3 and related discussion) of a facet-segmented repository. It should be noted that, in the processing of any particular beholder request, selected discrete content elements may be identified both from a selected target identity's facet-segmented repository, and from the facet-segmented repositories of other identities.

Figure 4B:
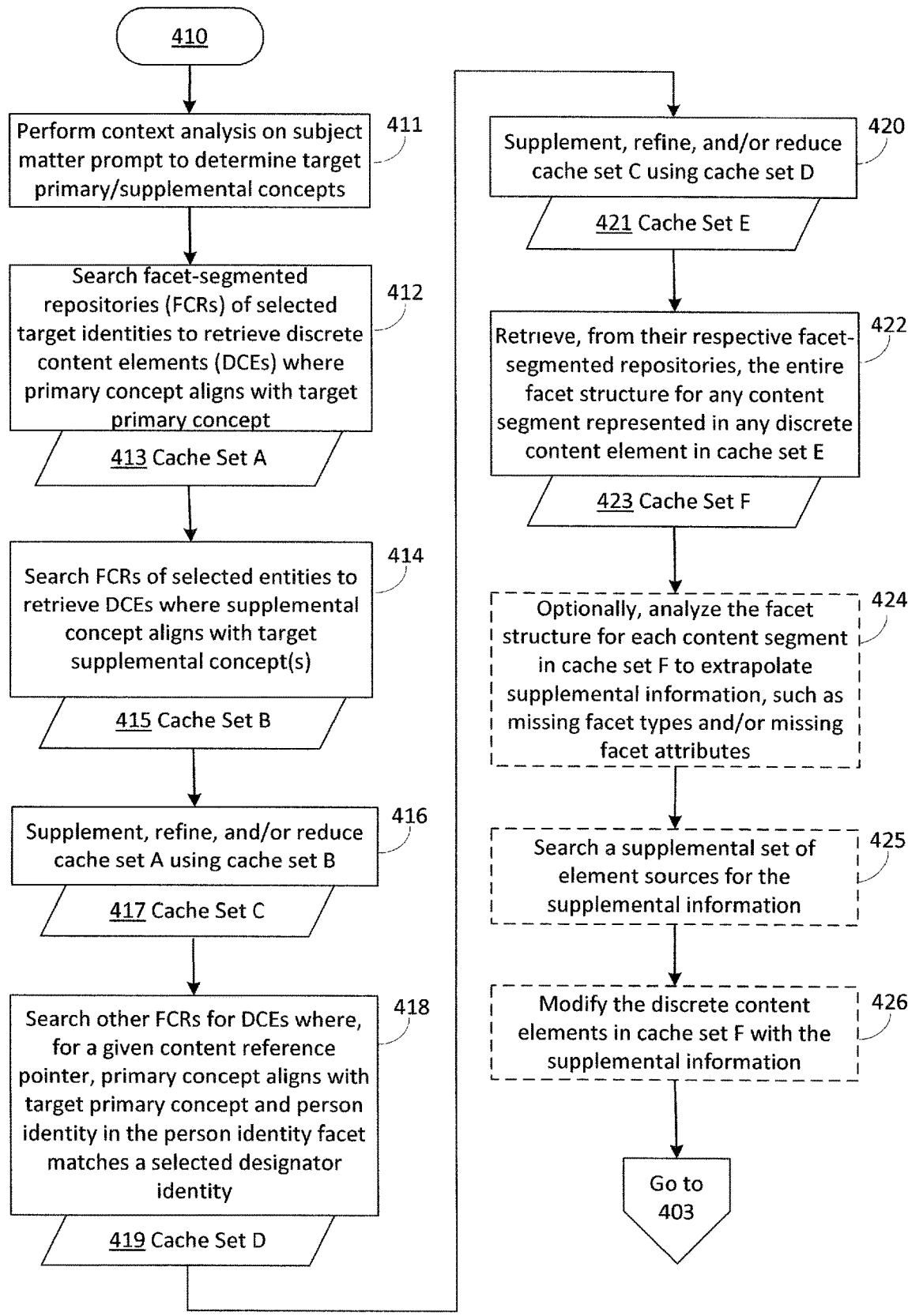
FIG. 4B shows an example process flow that may be used by some embodiments or implementations of a virtual experience system or service to determine selected discrete content elements from the facet-segmented repositories.

Turning briefly from FIG. 4A, FIG. 4B shows an example process flow that may be used by some embodiments or implementations of a virtual experience system or service to determine selected discrete content elements from the facet-segmented repositories. It should be noted that process flow 410 in FIG. 4B may show processing elements that may be present in some, but not all, embodiments or implementations, and/or that are optional in any particular instance; some embodiments may use other techniques for determining selected discrete content elements from the facet-segmented repositories. Processing elements in FIG. 4B include the following:

(411) Perform context analysis on the subject matter prompt to determine a target primary concept and target supplemental concepts. Aspects and examples of subject matter prompts were discussed in regard to FIG. 1 (e.g., 112). Techniques and systems for performing context analysis on content, including text and visual content, to determine conceptual subject matter are described in relation to FIG. 2A. In some embodiments, context analysis may be performed by a context analysis component 121 of a virtual experience service 120 in conjunction with content interpretation service(s) 130, as described in FIG. 1.

(412) Search the facet-segmented repositories associated with the selected designators of the one or more selected target identities to retrieve discrete content elements having a primary concept facet aligned with the target primary concept and use the retrieved discrete content elements to form cache set A 413. Methods of searching a facet-segmented repository vary according to systems and techniques used for storing and managing a facet-segmented repository in a particular embodiment or implementation. For example, in an implementation of a facet-segmented repository using an RDBMS, queries may be executed against a facet-segmented repository to search for discrete content elements having particular attribute values. Or, in an XML-based implementation of a facet-segmented repository, XML processing functions may be used in conjunction with XML Schemas (described, for example, in an XSD file) to find to specific elements or attributes and retrieve their values; full-text searching techniques may also be used. In some embodiments, searching (using queries or full text) may be supplemented with advanced search techniques and operators, such as fuzzy search, proximity search, word stemming, synonym databases, and acronym databases; in some cases, therefore, a primary concept facet being "aligned with" the target primary concept may not mean "strictly identical to".

(414) Search the facet-segmented repositories associated with the selected designators of the one or more selected target identities to retrieve discrete content elements having a supplemental concept facet aligned with the target supplemental concepts, using the retrieved discrete content elements to form cache set B 415. Methods of searching a facet-segmented repository in various instantiations have been discussed with regard to processing element (412).

(416) Supplement, refine, and/or reduce cache set A 413 using cache set B 415, forming cache set C 417. Cache set C contains discrete content elements (DCEs) having content with a particular conceptual classification stemming from the beholder request and related to the subject matter context. The DCEs in cache set C may be determined, for example, when DCEs in cache set A (or cache set B) are excluded from cache set C, when the DCEs in cache set A are supplemented by DCEs in cache set B, and/or when the DCEs in cache set B are used to refine DCEs in cache set A. Cache set A and cache set B may be processed together using set arithmetic, such as unions, joins, and intersections. Searches and filtering (including Boolean logic) may be applied to either cache set A or B to select DCEs for cache set C. For example, DCEs for cache set C may be selected by taking the union of cache set A and cache set B to form cache set C; DCEs for cache set C may be selected by taking the union of cache set A and B and then removing the DCEs that do not share a common content reference pointer, effectively meaning that a particular content segment must contain both a primary and supplemental concepts to be included in cache set C. Members of cache set C can be determined by performing searches of the union of cache sets A and B and filtering on individual DCEs. In some cases, a DCE in cache set A may be refined or replaced by a DCE in cache set B, such as when a content segment referenced in a DCE in cache set A is replaced by a more authoritative or higher quality (e.g., higher resolution, frame rate, less noise) content segment referencing a similar concept in cache set B.

(418) Search other facet-segmented repositories (i.e., not those associated with the selected designators of the one or more selected target identities) to retrieve discrete content elements where, for a given content reference pointer, the primary concept aligns with the target primary concept and the person identity in the person identity facet matches a selected designator identity, using the resulting DCEs to form cache set D 419. This processing element may have the effect of expanding the set of available content outside the facet-segmented repository(ies) of the selected identities with content segments from other target identities who might have DCEs where a selected identity is a relevant figure. For example, a content segment related to Mom surfing when she was a girl might be present in a facet-segmented repository of Uncle Bill's, but not Mom's. Methods of searching a facet-segmented repository in various instantiations have been discussed with regard to processing element (412).

(420) Supplement, refine, and/or reduce cache set C 417 using cache set D 419, forming cache set E 421. Methods of supplementing, refining, and/or reducing a cache set with another cache set in various instantiations have been discussed with regard to processing element (416).

(422) Retrieve, from their respective facet-segmented repositories, the entire facet structure for any content segment represented in any discrete content element in cache set E 421, using the results of the retrieval and the discrete content elements in cache set E 421 to form cache set F 423. Retrieval may be performed, for example, by determining all the unique content reference pointers in cache set E 421 (using searching and filtering techniques previously described for various kinds of instantiations of facet-segmented repositories) and retrieving all the discrete content elements having the same content reference pointer. This processing element may have the effect of expanding the set of available DCEs for building a compelling virtual experience container with, e.g., information and sensory facets relating to the currently selected content segments.

(424) Optionally, analyze the facet structure for each content segment in cache set F 423, using the schema of element facets to extrapolate supplemental information that may be needed in cache set F, such as missing instances of facet types and/or missing facet attributes. Then, search a supplemental set of element sources for the supplemental information (425) and supplement (or modify) the discrete content elements in cache set F 423 with the supplemental information (426). For example, if a 3D virtual experience of Mom at the Louvre is desired by the beholder, a virtual avatar of Mom might be placed in a 360-degree video of rooms in the Louvre provided on the museum's website. Methods of searching a facet-segmented repository in various instantiations have been discussed with regard to processing element (412).

Cache set F 423, optionally modified by processes (424-426), contains the selected discrete content elements from which the virtual experience container may be assembled in processing element (403) of FIG. 4A.

FIG. 4B illustrates one technique by which selected discrete content elements may be determined in element 402; other techniques are possible. In some embodiments, selected discrete content elements may be determined using machine learning and artificial intelligence methodologies such as neural networks. A neural network, such as a recurrent neural network (RNN), can be trained to associate existing content patterns with various subject matter prompts. The trained neural network can then be used to identify selected discrete content elements by directing the trained neural network to find similar content in the facet-segmented repositories given an input of the subject matter prompt. In some cases, a neural network may be trained in advance based on curated or historical subject matter prompts. In some cases, the neural network may be trained on-demand, i.e., at the time the discrete content elements are being selected for a given subject matter prompt.

In one instance, the existing content patterns may be derived from content returned from search engines in response to a search query formed from a similar subject matter prompt. Since search engine algorithms are suited to identifying and ordering content related to a natural language prompt based on ranking factors that prefer higher user click counts (a proxy indicator for relevance), the neural network is being trained to associate content that is preferred by a larger number of users with the prompt.

In another instance, the existing content pattern to subject matter prompt associations may be derived prior beholder requests. The system/service may store historical beholder request data that relates subject matter prompts (as well as UED properties) to the discrete content element selections made to build virtual experience containers related to that beholder request. The neural network may be trained on this historical beholder request data. As system usage grows, selection of discrete content elements may be enhanced in accuracy and relevance and performed more efficiently with respect to computing resources.

Given the input of the subject matter prompt (in the instant beholder request), the neural network can identify discrete content elements in the facet-segmented repositories that match to or are similar to the existing content patterns associated with the same or similar subject matter prompts.

Trained neural networks can be, for example, RNNs, Long Short Term Memory models (LSTMs), Generational Adversarial Networks (GANs), and Convolutional Nets (CNNs), or other types of neural network model or combination thereof. Each subject matter prompt may have its own trained neural network, or more than one subject matter prompt may share a trained neural network.

Returning briefly to FIG. 4A, a virtual experience container may be assembled from the selected discrete content elements in accordance with the user experience device parameters (403). At one end, a simple way of finding a variety of content based on a dynamic prompt and stitching it together. On another end of spectrum, create a complex virtual experience from digital content, extrapolated or emulated content, and virtual componentry (better), supplemented from outside sources.

Figure 4C:
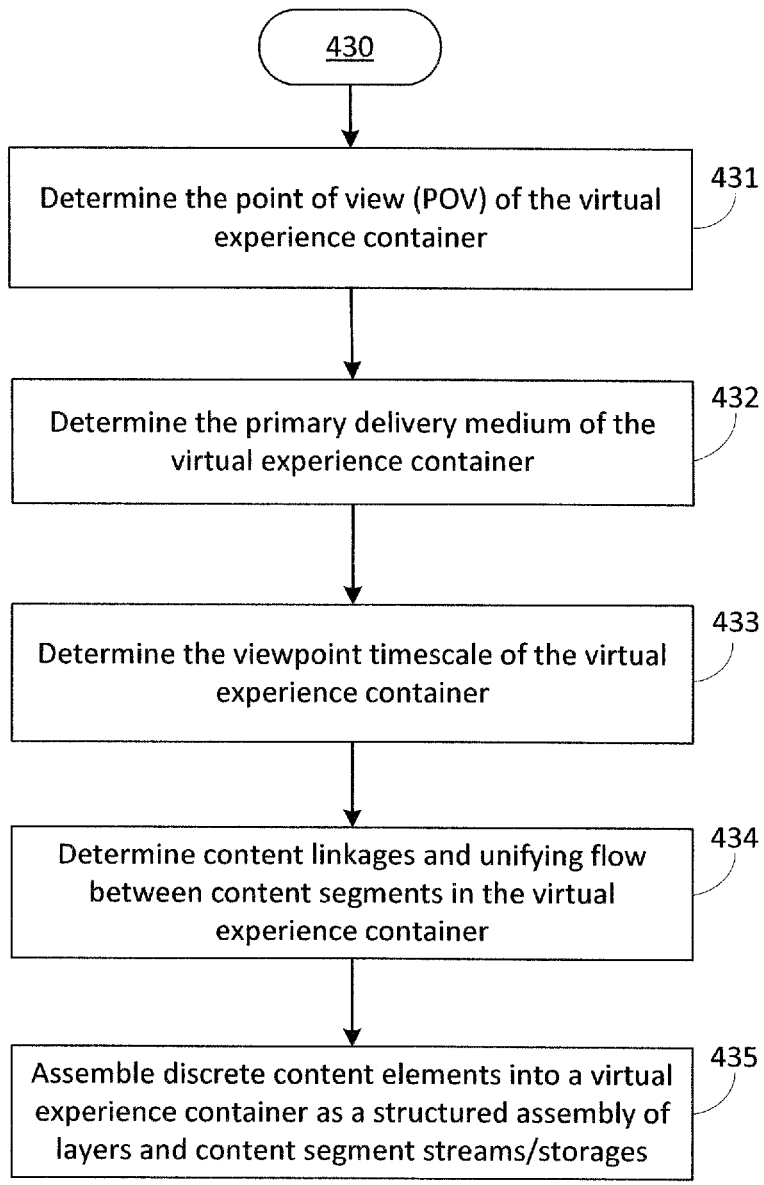
FIG. 4C shows an example process flow that may be used in some embodiments or implementations of a virtual experience system/service to assemble a virtual experience container from the selected discrete content elements in accordance with the user experience device parameters.

FIG. 4C shows an example process flow that may be used in some embodiments or implementations of a virtual experience system/service to assemble a virtual experience container from the selected discrete content elements in accordance with the user experience device parameters. Process flow 430 in FIG. 4C may show processing elements that may be present in some, but not all, embodiments or implementations, and/or that are optional in any particular instance; some embodiments may use other techniques for assembling a virtual experience container. Processing elements in FIG. 4C include the following:

(431) Determine the point of view (POV) of the virtual experience container. The POV indicates the perspective from which the content in the virtual experience container is to be perceived by the beholder. For instance, the virtual experience container may be rendered from the perspective of a beholder assuming the POV of, e.g., an anonymous observer, similar to the POV which a viewer of a movie takes; a target identity, as when the beholder assumes the POV of a target identity who recorded or is the object of recording of content; a non-party viewpoint, such as the POV of a bystander who is present in the content or virtually rendered; and a content-capturing device (e.g., a mobile video-recording device). Further, the beholder can take an active or passive role in the experience, e.g., by interacting with personalities or events in the virtual experience or by passively observing, as a movie-watcher does.

The POV of the virtual experience container may be determined from user experience device parameters, as well as from the availability and nature of discrete content elements in facet-segmented repositories (e.g., in cache set F 423). Some user experience device parameters may be selectable by the beholder. A user interface of a user experience device may allow the beholder to indicate which of the possible POVs the beholder would like to assume. For example, a user interface may enable the beholder to select a POV of the desired virtual experience at the time the beholder indicates a subject matter prompt, as part of an interactive process between the beholder and the virtual experience service of designing and refining the virtual experience container, and/or even during experience playback mode (which may cause all or part of the virtual experience container to be reassembled dynamically by a virtual experience system/service).

User experience device (UED) parameters such as the sensory-effect capabilities may also enhance or constrain the available POV options. UEDs without the ability to render 3D interactive experiences, for example, may limit the available POVs to non-interactive modes or to modes that are constrained to the POV of already-recorded content. The availability and nature of discrete content elements (e.g., in cache set F 423) may also help to determine the POV (e.g., by enhancing or constraining the available POV options). For example, if no discrete content elements are available containing voice recordings or voice samples of Uncle Bob, then a POV including interactive conversation with Uncle Bob may be unavailable; if no discrete content elements exist of Mom in Paris where Mom is the object of the video rather than the one holding the camera recording it, a POV of a beholder observing Mom (rather than one from Mom's POV) may be unavailable. In some embodiments, it may be possible to select discrete content elements using an attribute of a person identity facet or sensory facet that indicates whether the associated content is from the POV of the person identity.

(432) Determine the primary delivery medium of the virtual experience container. The primary delivery medium delineates the predominant manner in which content in the virtual experience container is to be arranged for perception by the beholder. The primary delivery medium indicates the substrate on which content from the discrete content elements is assembled. Examples of types of primary delivery medium include, but are not limited to, video (in two dimensions or three dimensions), an immersive VR experience, a rendering of an object or memento (e.g., in two or three dimensions, as a 2D image or image with 360-degree selectable perspective, a hologram, or a 3D volumetric image), audio of a target identity narrating a story, a virtual avatar, and/or a "conversation" with a chatbot.

Similarly to the POV, the primary delivery medium may be determined, in part, from user experience device parameters, including user-selectable user experience device parameters and sensory-effect capabilities. For instance, an immersive VR experience is unavailable to the beholder as a primary delivery medium when the beholder's user experience device lacks those sensory-effect capabilities. A beholder indication of the type of primary delivery medium desired for a virtual experience may be a determinative factor.

The primary delivery medium may also be determined, in part, by the subject matter prompt and the resultant subject matter context analysis. As a simple example, the subject matter prompt may indicate an explicit or implied preference for a primary delivery medium. For example, the subject matter prompt "Mom's video while sightseeing at the Eiffel Tower" strongly suggests that the beholder wants to see the content segment from the facet-segmented repository of Mom (the target identity). This video will likely form the primary delivery medium, or substrate, which may, or may not, be supplemented with supplemental content, such as additional information or associated sensory experiences that are otherwise not communicated in video content. As another example, a subject matter prompt "Grandma's wedding ring" suggests that a rendering of a memento is desired as the primary delivery medium.

Naturally, the availability and nature of discrete content elements may also help to determine the primary delivery medium, e.g., by enhancing or constraining the available primary delivery medium options. In some embodiments, it may be possible to assess and/or select discrete content elements using an attribute of the content segment or (sensory facet associated with the content segment) that indicates an appropriate primary delivery medium for the content segment.

(433) A related determination to the determination of the primary delivery medium is to determine the viewpoint timescale of the virtual experience container. The viewpoint timescale describes the desired timescale of the content related to the subject matter prompt. An indication of the viewpoint timescale can have the effect of selecting or determining discrete content elements for the virtual experience container. As a result of viewpoint timescale selection/determination, the number of discrete content elements may be reduced or increased; discrete content elements may be shortened, abstracted, summarized, or expanded upon; the discrete content elements may be sub-selected according to quality, importance, or some other property of the content segment. A viewpoint timescale may determine the time search criteria that are applied to the selection of discrete content elements for a virtual experience container.

For instance, a longer indicated timescale may mean that discrete content elements are selected over a longer time period, whereas a shorter indicated timescale may mean that discrete content elements are selected pertaining to a narrower range of events or content. For example, a viewpoint timescale indicating "best of"-type experience of all of "Mom's trips to Paris" may present a highlight reel of the best content (e.g., the best rated, most watched, or highest quality), whereas a viewpoint timescale indicating one of "Mom's trips to Paris", such as the most recent, may result in discrete content elements including all or most of the content segments from the most recent trip.

The viewpoint timescale may be determined, in part, by attributes of the beholder request which may be set, for example, by a beholder's indication using one or more user interface elements of the user experience device. In an example, a user interface element for selecting a desired viewpoint timescale might take the form of a slider bar that allows the beholder to indicate whether the content relating to the subject matter prompt should be viewed from a timescale encompassing a greater or lesser time range of a target identity's content. Labels on this example slider bar might indicate major gradients, such as (ranging from shortest to longest timescale) "clip", "chapter", "story", and "life biography". In some embodiments, user interface elements may allow the beholder to indicate a desired length of the virtual experience, which may also be part of the determination of the viewpoint timescale or selection/assembly of the discrete content elements in the virtual experience container.

Naturally, the viewpoint timescale may be determined, in part, by the subject matter prompt and the resultant subject matter context analysis, as well as by the nature of available discrete content elements in facet-segmented repositories.

In some cases, a range of available primary delivery media, POVs, or viewpoint timescales (assessed from, e.g., the available discrete content elements, user experience device parameters, subject matter prompt/context, sensory-effect capabilities, and/or other factors) may be presented, via a user interface of the user experience device, to a beholder who then is able to indicate a final selection.

(434) Determine content linkages and unifying flow between content segments in the virtual experience container. Related to the determination of the primary delivery medium is the determination of what links the discrete content elements together, and the corollary determination of what unifying content drives the flow of content segments in the virtual experience container to create a seamless experience for the beholder. This determination depends at least in part on the attributes of the beholder request in any given instance, varying in accordance with the nature of the particular subject matter prompt, user experience device properties, and potentially other factors. The determination of content linkages and unifying flow also depends on the nature of available discrete content elements.

On one end of the spectrum, some subject matter prompts may not particularly require content linkages and unifying flow, i.e., content linkages and unifying flow may be determined to be essentially unnecessary. For example, if a subject matter prompt suggests a virtual experience comprising a view of a favorite memento or other article, rendering the article (e.g., in 2D or 3D form, hologram, or volumetric image) and allowing the user to interact with it by rotation, zooming, or other techniques may be sufficient. Further, if a subject matter prompt indicates a discrete event or other content that amounts to what is primarily a replay of an existing video, audio, or multimedia content segment (whether or not it is supplemented by additional sensory or dimensional content), the particular content segment may be sufficient to stand alone. Further, if the subject matter prompt suggests that the virtual experience desired is a conversation with a virtual avatar or chatbot that emulates the personality or conversational style of a target identity, the unifying flow is implied by the dynamic processing of the chatbot/avatar in interpreting the conversation/questions of the beholder and responding accordingly; in other words, explicit content linkages are unnecessary because the unifying flow is provided by the beholder. Of course, the aforementioned are merely examples of types of subject matter prompts that may need fewer content linkages and unifying flow; many others are possible.

At another end of the spectrum, some subject matter prompts may entail a virtual experience container that is assembled from multiple content segments, as might happen when content segments spanning a long period are summarized and assembled (e.g., a subject matter prompt "Best of all of Mom's trips to Paris"). For instance, some types of subject matter prompts suggest a sense of time passing across diverse content segments. The content segment linkages and unifying flow may be provided in a number of ways to imply to the beholder relatedness of content. For example, a story or narrative content may provide the content linkages and flow. The story or narrative content may be existing content provided all, or in part, by the target identity in a discrete content element (such as a blog post, email, or other summary content). A narrative may summarize what happened in an intervening period between content segments. In some cases, the existing story or narrative content may be enhanced by or used as source material for an artificial intelligence (AI) to create the content-linking narrative. In some cases, the AI may create the narrative entirely using neural network-based image processing technologies to caption or summarize images or audio. A corollary determination relates to the expression mode of the narrative, e.g., original audio content (in either the target identity's voice or a simulacrum or emulation of same), text, imagery, etc.

In some cases, the content segment linkages and unifying flow may be provided by more basic means than a complex narrative, such as introducing UI elements or overlay content that indicate an origin time, source, or other information related the content segments as they are experienced. Simple fade-outs or other visual, audio, or tactile, transitions may be shown between content segments that suggest time passing or other relationships between content segments of a non-narrative nature. More complex techniques, such as hyperlapse photography or video, which is a time-lapse technique to speed up certain content, may be used to show time passing quickly (or more slowly) through intermediate content or less relevant content segments. The ability to hyperlapse visual content may be provided by technologies such as Microsoft Hyperlapse®, which creates smooth and stabilized time lapses from first-person videos. It should be noted that hyperlapse technologies may also be used to provide accelerations of content in accordance with the indicated viewpoint timescale.

The beholder request and the nature of discrete content elements in cache set F 423, in conjunction with techniques for determining POV, primary delivery media, viewpoint timescale, and content linkages and unifying flow, have provided indications of the content and structure used to assemble discrete content elements into a virtual experience container as a structured assembly of layers and content segment streams/storages (435), described in additional detail below.

FIG. 5 shows a diagram of an example structural arrangement of a virtual experience container. FIG. 5 will be described in conjunction with elements of the process flow of FIG. 4C (e.g., 435) to illustrate structural aspects relating to the FIG. 4C process flow.

In embodiments, assembling the virtual experience container includes formulating an initial base content layer 510 (or substrate content layer) in accordance with the primary delivery medium (e.g., determined in element 432). As noted with respect to determination of the primary delivery medium, the base content layer 510 can be constructed from content such as, but not limited to, video (in two dimensions or three dimensions), an immersive VR experience, a rendering of an object or memento (in two or three dimensions, e.g., as a 2D image or image with 360-degree selectable perspective, a hologram, or a 3D volumetric image), audio of a target entity narrating a story, a virtual avatar, and/or a "conversation" with a chatbot. Base content layer 510 may be constructed of one or more discrete content element (DCE), of which element 512 is illustrative.

In some cases, the base content layer 510 may be formed from a "primary presentation matrix" 517 on which discrete content elements (e.g., 512) are overlaid. For example, a base content layer 510 comprising an immersive VR experience may begin with an initial VR matrix on which content contained on other DCEs depicted. The initial VR matrix may, for example, be blank or constructed from existing matrices, such as those that render places, environments, times/epochs/eras/milieus and which are available, e.g., as discrete content elements from facet-segmented repositories and/or information feeds.

Discrete content elements (of which 512 is illustrative) for the base content layer may be selected in accord with the determined POV described in regard to processing element 431. Discrete content elements (e.g., 512) for the base content layer may be arranged in a direction of flow 511 and with a length of content and delivery pace that accords with the viewpoint timescale described in regard to processing element 433. Multiple DCEs may be present in a given time segment of the time flow of the virtual experience container; multiple content segments from multiple DCEs may be arranged simultaneously or overlappingly on a base content layer 510 primary presentation matrix 517.

In some cases, narrative content 513 (described in regard to processing element 434) may be arranged to be presented along with, parallel to (or in other relation to) the primary content stream. For example, existing or autonomously generated audio narrative (see, e.g., 434) content might coexist with or overlay a base content layer 510 that is arranged as a directional flow of multimedia content. One or more linkage, of which 514 is illustrative, may infuse the interstices between DCEs (e.g., 512) to provide transitions between DCEs in the form of audio, visual, or other sensory experiences. In some cases (as discussed in 434), linkage(s) 514 may accelerate, decelerate, time-lapse, or otherwise affect the playback timescale of content to produce a transitional effect between content, e.g., to indicate time passing.

In some embodiments, a virtual experience may be interactive, and the direction of flow through a virtual experience is determined interactively in conjunction with indications by the beholder. In such cases, the direction of flow 511 may not be a single stream in which content is laid out serially, but may have branches or multiple paths, with each path potentially, but not necessarily, providing different content. Navigation of a virtual experience having branching flow paths may be provided by linkages 514 that present content allowing a beholder to move from one optional direction of flow branch to another. For example, the virtual experience may present linkages that allow the beholder to navigate the virtual experience (e.g., by selecting whether to enter one virtual "room" in a VR experience instead of another). In some cases, a beholder may navigate a multi-branched virtual experience by interacting with a chatbot or other intelligent agent that converses with the beholder and allows the beholder to describe navigation preferences or indicate choices in the direction of flow. Technologies for building bespoke chatbots based on interactive training data constrained by rule sets include Project Conversation Learner from Microsoft®. In such cases, the narrative content 513 can be represented by a chatbot AI and linkages are represented by navigation options implied by training and business rules of the bespoke chatbot.

The content segment(s) referenced in a DCE 512 may be an embedded content segment 515; for example, it may be stored within the storage repository of the virtual experience container itself. Some DCEs 512 may point to an external content segment 516 that is stored outside the virtual experience container construct, e.g., via a URL or API call to a streaming service. This advantageously may have the technical effect of reducing storage size of the virtual experience container or optimizing transmission of a virtual experience across networks.

In embodiments, additional layers (beyond the base content layer) of a virtual experience container structure may provide an enhanced virtual experience. An additional layer may contain content segments and/or program instructions for rendering content as part of the "playback" of the virtual experience. Additional layers may render additional informational content 520, sensory-effects 530, and/or personality 540 aspects in conjunction with the subject-matter-focused content that is primarily provided by the base content layer in its primary flow/narration.

A layer in the virtual experience may be divided into sub-categories or sub-layers, and any sub-category or sub-layer may not be present in any particular virtual experience container. As described previously, a virtual experience container contains layers appropriate to the user experience device parameters, including the capability manifest of the sensory-effect hardware array, as well as beholder request aspects such as the subject matter prompt and indications of beholder preferences as to the desired virtual experience. These aspects of a beholder request affect the presence of layers and sub-layers in any given virtual experience container. Advantageously, these technical features (e.g., bespoke assembly based on UED capabilities and layered virtual experience container structure) enable a virtual experience container structure that is dynamically arranged and flexible enough to accommodate a wide array of virtual experience variations (e.g., depending on beholder request and user experience device parameters), with the effect that virtual experience container data size is optimized for storage and transmission across networks.

In some embodiments, an informational layer 520 provides content and program instructions 521 for rendering, in various aspects, information-related facets—which include but are not necessarily limited to place, temporal, environment, person identity, supplemental concept, and cultural facets—relating to the content segment being experienced in-stream during virtual experience "playback." This can include content from any information-related facet (or facet attribute thereof) that may enhance a beholder's virtual experience of a target identity or the subject matter, such as weather, historical facts, genealogy-related information, and cultural artifacts. For instance, a display dashboard may show factors of interest about a target identity in relation to the currently displayed content segment; e.g., Mom's trip to the Eiffel tower might be enhanced by information from a genealogy or DNA information feed about Mom which tells the beholder that Mom is 1/16 French, via a descendant of Louis-Napoleon Bonaparte.

In some cases, the nature of, or relationships between, content segments of the base content layer 510 may be modified in accordance with rendering instructions in the informational layer 520. For example, an attribute of the environment facet (e.g., obtained from an information feed) may indicate that the weather in Paris the day of Mom's trip to the Eiffel tower was rainy. Weather information could be overlaid or rendered on the virtual experience base content in a display dashboard indicating factors of interest about Mom's experience. Rendering instructions can be used to integrate information content even more tightly into the virtual experience playback: for example, if the base content layer of Mom's trip to the Eiffel tower is initially produced, for example, from a VR matrix of Paris near the Eiffel tower, the VR matrix could include content (e.g., clouds, rain) indicating rainy weather. In some embodiments, rendering instructions can integrate period-related content into content segments in a base content layer 510; in an example of cultural facet integration, Grandpa could be shown wearing a period-appropriate hat when depicted as a virtual avatar in a virtual experience of an event he attended in 1950s America.

Some embodiments include techniques and systems for modifying the virtual experience container in accordance with the sensory-effect capabilities of the user experience device. In its simplest form, modification of the virtual experience container may mean removing or altering content segments that express sensory-effects that a user experience device is not capable of rendering. This might occur, for example, when a content segment is available that expresses 3D video of a scene, but the user experience device on which the virtual experience is to be rendered is a small-screen mobile device; in such a case, e.g., the 3D content segment might be transformed to a lower dimension (2D) or lower resolution, or a different content segment might be used.

Sometimes, however, native content segments in any given instance might lack support for a complete virtual experience using all of the sensory-effect capabilities of a beholder's user experience device. Therefore, in embodiments, available content segments may be supplemented with additional discrete content elements to support a full range of experiences. Accordingly, some embodiments include techniques and systems for supplementation, e.g., of sensory-effects, expansion of content dimension, or content enhancement. Supplementation to accommodate additional sensory-effect capabilities can take the form of additional sensory facets retrieved from a sensory element source, and/or, in some cases, sensory-effect hardware control meta-instructions 531.

A sensory-effect layer 530 may be present in the virtual experience container in some embodiments and/or instances to support alignment of the virtual experience container with user experience device parameters. Sensory-effect layer 530 can induce sensory-effects in a beholder by including discrete content elements classified as sensory facets in placement points along the playback stream that coincide with the primary content segments of the base content layer.

A sensory-effect layer 530 may be constructed by determining the sensory-effect capabilities of the user experience device from the user experience device parameters (see, e.g., FIG. 1 and FIG. 6 and related discussion) and selecting discrete content elements classified as sensory facets that are associated with content segments in the base content layer 510. In some cases, a user experience device might support a sensory-effect capability, but processing of the facet-segmented repository reveals a sensory facet does not exist related to the primary content. In such cases, additional sensory facets may be retrieved from sensory element sources to supplement the virtual experience container.

For example, if a virtual experience contains video of a strawberry field, and the user experience device supports an olfactory sensory-effect capability, the virtual experience container might be supplemented with sensory-effect content in the sensory-effect layer 530 to induce the smell of strawberries in the beholder during the time the video of the strawberry field is rendered during virtual experience playback. As another example, if a virtual experience container has content with only visual/textual content of a letter, and the user experience device has audio capability, the virtual experience container might be enhanced to include audio of the letter being read aloud, e.g., using emulated speech of the target identity-author. Technologies such as Lyrebird® allow the creation of an emulated digital voice that sounds like a chosen person (e.g., a target identity) by training it using very short voice samples of the person.

Sensory-effect layer 530 can also include sensory-effect hardware control meta-instructions 531 which can induce a sensory-effect relating to the base layer content in a beholder using a sensory-effect component of the user experience device. Sensory-effect hardware control meta-instructions 531 may enhance or transform a content segment rendered using a given kind of sensory-effect component during virtual experience "playback" by adding a sensory-effect, dimensional, or content enhancement experience in accordance with the user experience device parameters.

In some embodiments, modifying the virtual experience container may include expanding a dimension of content by associating depth elements from a visual element source to the related two-dimensional content elements in the virtual experience container. For instance, existing two-dimensional (2D) content segments may be transformed into 3D simulated content segments by adding parallax effects to 2D images using software such as Adobe Photoshop® to create depth maps of images, then using JavaScript libraries such as "pixi.js" to perform the rendering of the depth map. Existing 2D content can also be transformed into 3D content by rendering it on VR headset, and by using a three-dimensional free-space volumetric display platform based on photophoretic optical trapping that is capable of rendering 3D, full-color, aerial volumetric images with 10-micron image points (see, e.g., Smalley et al., "A photophoretic trap volumetric display," *Nature* 553, 486-490, which is incorporated by reference in its entirety), as well as other techniques.

In some embodiments, modifying the virtual experience container may include associating temporality progression elements (e.g., the experience of time passing) with content elements in the virtual experience container. Temporality progression of narrative flow using linkage(s) 514 containing transitions or time-lapse content have been described previously. Time-lapse and hyperlapse techniques may also be used to induce a time-passing effect within content segments via the sensory-effect layer. Other techniques for video include using animation techniques to take a series of related pictures and assemble them to show movement (e.g., using Animated GIF assembly of still images, or processing still images with Adobe Photoshop® After Effects). In other cases, content elements might be given temporality progression aspects by associated the content elements with accelerated (or slowed) audio, e.g., by speeding up (or slowing down) an audio track of the content or adding a new audio track (e.g., a ticking clock or metronome, the sound of a racecar, etc.). More sophisticated temporality progression elements might include inducing touch- and/or position-related sensory-effects in the beholder, such as disorientation to show that something is happening rapidly, or temperature to induce sweating and show that the content segment being rendered in the virtual experience requires a sustained effort. Any of these temporality progression effects may be produced by the use of existing or supplemental discrete content elements classified as sensory facets, or by sensory-effect hardware control meta-instructions 531 present in the sensory layer 530 (e.g., meta-instructions to command a sensorium "pod" to raise the temperature inside the pod).

In some embodiments, the sensory-effect layer 530 may include sensory-effect hardware control meta-instructions 531 to perform content enhancement on lower-quality content segments. For example, certain visual content may have low-resolution or poor quality, such as scanned images, images/video captured with older and/or lower megapixel cameras, images/video stored in lower resolutions or compressed, and images/video of distant objects or obscured by weather conditions). For instance, machine-learning techniques, such as Generative Adversarial Networks (GANs), may be used in some implementations to transform low-resolution images into super-resolution images (see Ledig, et al., "Photo-Realistic Single Image Super-Resolution Using a Generative Adversarial Network," arXiv: 1609.04802, which is incorporated by reference in its entirety). As another example, audio content may be enhanced by removing background noise, wind and rustling, mouth clicking sounds, breathing sounds, hum, by emphasizing certain dialogue, as well as by performing many other kinds of enhancements, using tools such as iZotope® RX and Audacity®.

In some embodiments, sensory-effect hardware control meta-instructions 531 may take the form of directives to the virtual experience service 120 (or component thereof) to perform transformations of content elements using third-party tools (e.g., Adobe Photoshop or iZotope). These kinds of meta-instructions may be executed by the virtual experience service during a post-assembly process to replace certain content elements in the base content layer 510 with enhanced content in accordance with the particular user experience device that will render the virtual experience. The post-assembly process may also execute the meta-instructions for content enhancement on-demand, as when a virtual experience container is streamed over a network.

In some embodiments or instances, for instance those implementing virtual experience containers that support interactive scenarios between a beholder and target identities (e.g., a chatbot, a virtual avatar rendered in a virtual world), a personality layer 540 may be present in the virtual experience container. A personality layer 540 may support dynamic changes in the direction of flow 511 (e.g., via direction of flow branching as described previously) at inflection points in the direction of flow 511.

A personality layer 540 can support, for example, a personality AI/RNN 541 that enables autonomous processing of personality characteristics of a target identity in response to content segments rendering in the base content layer. Personality characteristics may incorporate aspects of human personality such as those described previously in regard to personality trait, sentiment, and emotion facets and the various methods for autonomously categorizing content into these facets using machine learning techniques. As noted, each of these facets may reference content segments associated with a primary concept and supplemental concepts, and those associations may describe how a person identity might feel about certain concepts being depicted in content shown in the base content layer. In some embodiments, systems and techniques may be applied which use discrete content elements in a selected target identity's facet-segmented repository (as well as those in other, associated identities) to train a personality RNN 541 with personality trait, sentiment, and emotion facets in relation to primary and supplemental concepts. When options or alternative branch paths exist, the choice of branch paths through the direction of flow 511 may be determined by personality characteristics modeled by the personality layer AI/RNN 541. (For example: Would the target identity be likely, based on prior personality characteristics, to avoid or to engage in a confrontation with another person? Given a choice, via competing alternative branch paths, between reading a book and watching basketball on television, what would the target entity do?)

A virtual experience service 120 may continuously train a distinct personality RNN for any or all target identities having facet-segmented repositories. The virtual experience service 120 may train each instance of a personality RNN continuously as discrete content elements are added to or modified in facet-segmented repositories; the virtual experience service 120 may also train a personality RNN when an interactive virtual experience is demanded. In some cases, the personality layer 540 may encode the personality RNN 541 as program instructions into the virtual experience container which, when run by the user experience device, produce an output from some input. In some cases, the personality layer 540 may contain a reference pointer to one or more personality RNNs of particular target identities that are stored on the virtual experience system/service, e.g., in computer-readable media. A reference pointer to a personality RNN may be described, e.g., as a URL or parameter to an API function that can be called during the playback of the virtual experience container by the user experience device. Reference pointers may allow a virtual experience system/service to support many simultaneous virtual experiences with higher storage, bandwidth, and processing efficiency than embedded personality RNNs, in addition to allowing the personality AIs to continuously improve as content about a target identity expands.

Once trained, a personality RNN 541 may take as input primary and supplemental concepts (of content currently in the playback stream of the virtual experience) and output personality states including traits, emotions, and sentiments. These personality states may be used to reflect emotions in a virtual avatar or chatbot representation of the target identity, such as expressions of happiness, sadness, or anger in relation to certain content, an annoyed or excited conversational tone, or behaviors of the virtual avatar or chatbot, such as having the virtual avatar choose one type of activity over another at a flow branch or steering the conversation toward or away from a particular topic.

In some embodiments, during assembly of the virtual experience container, the selected content elements may be modified in accordance with beholder properties of the beholder associated with the beholder request. Beholder properties are data elements stored on the computer-readable storage media of a virtual experience service/system that describe characteristics of a beholder. Beholder properties may be added, removed, and modified by a beholder during or after registration for an account on the virtual experience service/system. In some cases, beholder properties may be gathered or inferred from beholder usage data, or via connection of the beholder's virtual experience service account with third parties such as OSNs and advertising networks. Beholder properties can include information about the beholder, including demographic data and self-selected preferences. Some non-limiting examples of beholder properties include age, relationship to target identities, moral/cultural sensitivity level, culture, ethnicity, religious background, nationality, residence, legal constraints, etc.

Beholder properties may be used to modify selected content elements by reducing or expanding the selected content elements in accordance with some criteria relating to the beholder properties. For example, content elements of a risqué nature, such as partial nudity or revealing clothing, might be filtered and excluded from the virtual experience container designated for a beholder with the beholder property of being under age eighteen. As another example, a chatbot representing a target identity might select a different tonality or vocabulary when speaking to a child beholder having the beholder property of being less than seven years old. Selected content elements might be modified to be less crass, profane, or lowbrow for beholder with a beholder property indicating moral sensitivity. Supporting these features, in some embodiments discrete content elements may be classified according to a schema of element facets that have as attributes their age-appropriateness or moral sensitivity, so that such content elements may be filtered in accordance with beholder properties during virtual experience container assembly.

Returning now to FIG. 4A, the virtual experience container may be provided to the user experience device (404). A virtual experience container, such as the one depicted in the example structure in FIG. 5, may be arranged in a variety of ways. For example, it may be arranged as a multi-dimensional array containing both binary data (e.g., content segment streams in their native formats) and metadata arranged in time series according to the direction of flow of the virtual experience container playback. Each dimension may approximate a "layer" as described in FIG. 5, with layers operating in parallel to render content or provide instructions depending on the nature of the layer. A virtual experience container may contain pointers to outside content segments, e.g., using embedded URLs to initiate streaming of content from external services. Other arrangements may also be used, such an XML metadata file that stores properties and the direction of flow, along with embedded binary large object (BLOB) data or pointers to separately stored BLOB data. A virtual experience container may be a proprietary file format which may embed content, reference content, stream content, or any combination thereof. It is contemplated that, while used in the singular form herein, a virtual experience container can comprise one or more physical files, temporary files, storages, and/or dynamically-generated streams, which may in fact be stored on different computer-readable storage media across one or more services or systems. Depending on the embodiment, the nature of the virtual experience, and the user experience device parameters, a virtual experience container may be provided in a number of ways, such as by a file or stream download to the user experience device (including a file that can begin to be "played" before the download is complete). A virtual experience container may also be streamed by being downloaded into player software that buffers content in a temporary cache in advance of playback. Other variations of arrangement still within the scope of described embodiments may suggest themselves to the ordinarily skilled practitioner.

After construction and storage of a facet-segmented repository associated with a target identity containing discrete content elements categorized according to primary and supplemental concept, techniques and/or systems may be provided in some embodiments to analyze the facet-segmented repository to determine one or more correlated subject matter prompts from the discrete content elements. Determining one or more correlated subject matter prompts may be performed by undertaking conceptual grouping techniques to find the most prevalent concept topics. Many techniques for conceptual grouping are available; one, for example, uses "conceptual clustering" (e.g., with algorithms such as COBWEB) to do unsupervised classification of concepts into hierarchical structures. Another technique uses simple primary concept and/or supplemental concept counts to derive an understanding of the conceptual topics of the "most available content-segments" in a facet-segmented repository. Another technique might refine the set of dominant conceptual topics (determined, e.g., from one of the first two techniques) by performing an element source (e.g., web) search for candidate concepts that are of particular interest. Candidate concepts may then be formulated into one or more correlated subject matter prompts using natural language processing techniques. Determination of correlated subject matter prompts may be autonomously performed by a system or service as a background process, then stored on computer-readable storage media, in advance of demand for a virtual experience by any particular beholder.

In response to receiving a request for a virtual experience including the target identity, at least one suggested subject matter prompt may be provided to the beholder from the correlated subject matter prompts. In some cases, the subject matter prompts may be ranked according to a beholder's likely interest based on prior chosen subject matter prompts or other beholder usage data. In some cases, chatbot technologies, such as Microsoft's Project Conversation Learner, may be used to interact with the beholder and provide assistance in finding, narrowing down, and/or deciding on a subject matter prompt for a beholder request.

In some embodiments, the correlated subject matter prompts may be used to pre-compile all or part of a virtual experience container using the discrete content elements related to one or more of the correlated subject matter prompts. Pre-compilation of all or part of a virtual experience container may be performed by taking a correlated subject matter prompt and applying techniques for determining and assembling a virtual experience container as described, for example, in relation to FIGS. 4A-4C. In pre-compilation, a proxy "beholder request" may be generated that contains a subject matter prompt equivalent to one of the correlated subject matter prompts, a selected target identity equivalent to the target identity associated with the facet-segmented repository, and a "model" user experience device derived, e.g., from common user experience device parameters or from the actual user experience device parameters of existing beholders associated with the target identity.

The pre-compiled virtual experience container can then be provided in response to receiving a beholder request having matching or compatible user experience device parameters and a subject matter prompt matching or aligned with a correlated subject matter prompt for which a pre-compiled virtual experience container has been created.

FIG. 6 shows a block diagram illustrating an example embodiment of a user experience device/system for selecting and presenting a virtual experience container to a beholder. A user experience device/system 600 may be an embodiment or instance of user experience device 100 (or vice versa) and may have (but is not limited to) the various morphologies, form factors, and hardware arrangements described in respect to user experience device 100.

Figure 7:
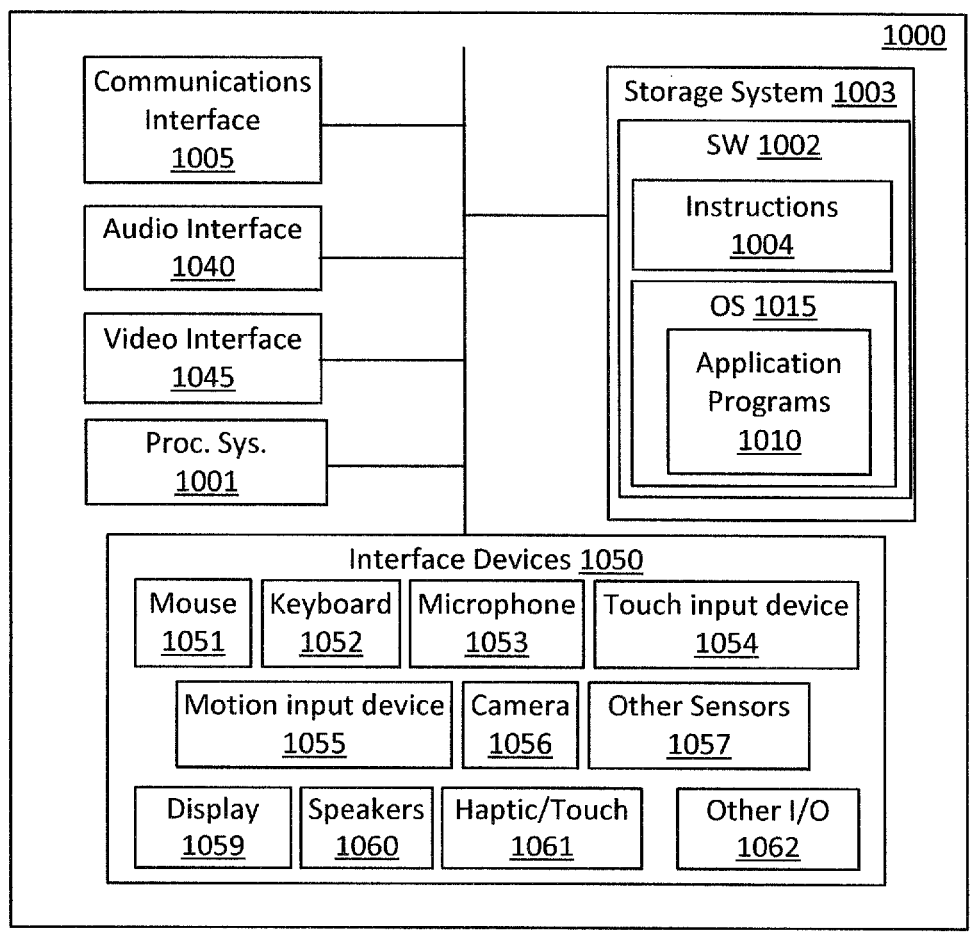
FIG. 7 shows a block diagram illustrating components of a computing device or system used in some embodiments of techniques, systems, and devices for facilitating the construction and presentation of virtual experiences of target identities in a subject matter context.

User experience device/system 600 may itself be an instance of computing device or system 1000, as described in regard to FIG. 7, and have components or subsystems as described therein, such as processing system 604 (which may be an instance of processing system 1001). A user experience device/system 600 may interact with systems or services distinct from itself, such as virtual experience service 120 (as described in FIG. 1, for example) for obtaining a virtual experience container or other function, as well as other systems/devices 630 (e.g., cloud storage services, OSNs). Such interaction may occur over a network via a communications interface 605 (which may be an instance of communications interface 1005 as described in FIG. 7).

User experience device/system 600 includes a user interface system 606 for presenting user interfaces and receiving user input and indications. User interface system 606 may comprise an audio interface 1040, video interface 1045, and one or more interface devices 1050 as described in FIG. 7.

User experience device/system 600 includes a sensory-effect hardware array 615 for presenting perceptible content to the beholder from a virtual experience container. Components of a sensory-effect hardware array 615 may include one or more of the components in user interface system 606. In addition to the traditional audio and video capabilities present in many common user experience device morphologies, the sensory-effect hardware array 615 can include a variety of lesser-known components for inducing sensory effects in beholders. Components of the sensory-effect hardware array 615 may, in some cases, be coupled to the user experience device 600 via coupling technologies such as PCI, IEEE 1284, universal serial bus (USB), HDMI, and DisplayPort.

Components of the sensory-effect hardware array 615 might provide a user experience device 600 with the ability to, for example, render video in 2D or 3D, render holograms, create lighting effects or lighting conditions, hear and interpret speech/sounds, generate touch feedback or positional sensations (e.g., pain, temperature, sense of balance, pressure, vibration, sense of body parts and movement, chemoreception), and cause gustatory or olfactory sensations. For example, VR and/or augmented reality (AR) devices can enable immersive 3D sensory effects and complex positional feedback as part of rendering of a virtual experience container. Many additional examples of sensory-effect hardware components related to various user experience device morphologies have been described in regard to FIG. 1, such as a gaming system, a "Sensorama", a sensorium room, and a sensory feedback body suit.

Some user experience devices may have components in the sensory-effect hardware array 615 that are capable of depicting lesser-dimensional content as higher-dimensional content, such as rendering 2D content in 3D, as described, for example, in regard to FIG. 4C. Such components might include, e.g., holographic and near-holographic rendering displays, such as holographic near-eye displays for virtual and augmented reality by Microsoft® (see, e.g., _https://www.microsoft.com/en-us/research/project/holographic-near-eye-displays-virtual-augmented-reality/). Some user experience devices may be fitted with components of VR apparatuses (e.g., Oculus Rift®) to provide sensory-effect hardware components for dimensional expansion. Certain user experience devices, such as mobile phones (e.g., Amazon Fire® Phone), may have display systems and associated capabilities for depicting an enhanced perspective (e.g., depth perception of visual content) during rendering or interaction. User experience devices may also have sensory-effect hardware components, such as a three-dimensional free-space volumetric display platform based on photophoretic optical trapping, that is capable of rendering 3D, full-color, aerial volumetric images with 10-micron image points (see, e.g., Smalley et al., "A photophoretic-trap volumetric display," *Nature* 553, 486-490, which is incorporated by reference in its entirety).

User experience device/system 600 may have computer-readable storage media 601, as described with respect to storage system 1003 in FIG. 7. Operating system (OS) 602 software/firmware and/or application programs 603 may reside on computer-readable storage media 601, as described in regard to OS 1015 and application programs 1010 of FIG. 7.

Computer-readable storage media 601 may also include program instructions for a beholder request component 610 and/or an experience delivery component 620. Beholder request component 610 may be an embodiment or instance of beholder request component 105 (described in relation to FIG. 1), and experience delivery component 620 may be an embodiment or instance of experience delivery component 160 (also described in FIG. 1). Accordingly, they may interact with any systems and perform any techniques attributed to those components, respectively.

Components 610 and 620 facilitate the interaction between the user experience device 600 and the virtual experience service 120, for example through an application programming interface (API) of the virtual experience service 120. In some cases, the beholder request component 610 and/or the experience delivery component 620 can be components of one or more application programs 603 resident on the user experience device 600. For example, an application program can be a desktop application, mobile device app, or control menu on a gaming, VR, or smart TV device that interacts with a virtual experience service 120 resident in the "cloud." An application program can also be based on script and content that, when rendered on a web browser, displays various user interaction capabilities on the user experience device 600.

Beholder request component 610 may operate to form and transmit a beholder request (e.g., 110) to a virtual experience service 120. A beholder request can be formed as a result of a beholder interacting with the user interface system 606 of user experience device 600 (e.g., via the user interface of an application, OS, or other component) to indicate the beholder-selectable aspects of the beholder request, including designators for the selected identities and a subject-matter prompt, both of which are described, e.g., in regard to FIGS. 1 and 4A. User interfaces for receiving input from a beholder pertaining to a beholder request may be rendered in response to program instructions in the beholder request component 610.

For instance, beholder request component 610 may direct the rendering of one or more user interface elements on user interface system 606 for indicating a subject matter prompt. As noted previously in FIG. 1, a subject matter prompt may be indicated by the beholder using various common user interface elements, including natural language command interpretation. Beholder request component 610 may render user interface elements for displaying and receiving an indication of subject matter prompt suggestions or options provided by the virtual experience service 120 as, for example, when a virtual experience service responds to a beholder request with additional questions, clarifications, or pre-processed subject matter prompts.

In some embodiments, beholder request component 610 may direct the rendering of user interface elements on user interface system 606 for a timescale selector. A timescale selector indicates a beholder preference for a timescale that provides additional context to the subject matter prompt. A timescale selector can indicate a varying timescale for the content that is associated with the virtual experience container, and may have indicator labels, such as whether the virtual experience container content should be assembled as a clip (e.g., a single event lasting a short time, such as content from a single rock concert); a chapter (e.g., a view of a particular type of subject matter content over a longer period, such as a virtual experience that allows the beholder to recap all the rock concerts they attended in their twenties); a story (e.g., a view of a time period, such as "the year I spent in Rome"); and a life-bio (e.g., a view of significant events in the entire life of a target identity). Naturally, many variations of the indicator label descriptors and effect of settings of the timescale selector on the virtual experience container assembly are possible. The assembly of the virtual experience container in accordance with the indication or setting of the timescale selector is discussed, e.g., in regard to FIGS. 4A-4C.

Some embodiments may provide novel interfaces, such as an anchor setting, for navigating, selecting, and interacting with subject matter prompts. In an implementation, a beholder request component 610 may direct the rendering, via the user interface system, of a user interface comprising selectable digital artifacts arrayed in an anchor setting, wherein the anchor setting is derived from content stored in the beholder's account. Indicating a selected digital artifact generates the indication of a beholder request including a subject matter prompt based on the identity of the selected digital artifact.

A beholder request component 610 may also provide user interface elements for receiving beholder-provided content related to a target identity. User interface elements may be employed to find and upload content (e.g., photos, multimedia files) to the virtual experience service 120 or to direct (e.g., via hyperlinks) the virtual experience service 120 to content stored on one or more accessible systems/services. Additional information about beholder-provided content is described in regard to FIGS. 1 and 2A-2B.

A beholder request component 610 may provide user interface elements for indicating target identities. For instance, user interface elements may be used to display available target identities associated with a beholder account. Upon indication of a selected target identity by the beholder, selected designators of the one or more target identities may be included in a repository compilation request and/or beholder request.

In some cases, beholder request component 610 may direct the rendering of one or more user interface elements for initiating a repository compilation request 109, including user interface elements for indicating one or more data elements of a designator data structure for a target identity. The designator data structure and its associated data elements are described in regard to FIG. 1. User interface elements for indicating a topical limiter (discussed in regard to FIG. 2A) may be provided by a beholder request component 610 for initiating a repository compilation request 109. Having received relevant input from beholder interactions with the user experience device, beholder request component 610 may communicate with the virtual experience service 120 to send the repository compilation request. Accordingly, upon receiving an indication via the user interface system 606, a beholder request component 610 may send, via the communications interface 605, a repository compilation request.

In some cases, beholder request component 610 may direct the rendering of user interface elements for configuring or modifying user experience device parameters (e.g., 113) that can be set by the beholder. To summarize from FIG. 1 and elsewhere, user experience device parameters 113 are data structures that transmit essential information about the user experience device's 600 various sensors, actuators, rendering capabilities, and other resources to the virtual experience service 120 so that the virtual experience container 150 can be specifically targeted to the user experience device 600. In some cases, a beholder's experience delivery preferences may also be included in the user experience device parameters 113. For example, the beholder may not want to experience touch sensations even if the user experience device 600 is capable of delivering them.

User experience device parameters 113 include a capability manifest of the sensory-effect hardware array 615. A capability manifest is an inventory of hardware and software capabilities of the user experience device, including installed sensory-effect hardware, sensors, actuators, and other devices. A capability manifest may be obtained by a beholder request component 610 by, for example; enumerating or querying an OS device driver or system service registry for devices of a certain type; detecting whether software modules that control sensory-effect hardware exist on the system; making dynamic calls at runtime to particular software libraries; and having a beholder indicate sensory-effect hardware with a user interface at the time a beholder request component 610 (or application of which the component 610 is part) is installed or executed.

Having received relevant input from beholder interactions with the user experience device, beholder request component 610 may communicate with the virtual experience service 120 to send a beholder request (e.g., 110). Accordingly, upon receiving an indication via the user interface system 606, a beholder request component 610 may send, via the communications interface 605, a beholder request comprising the subject matter prompt, the selected designators of one or more selected target identities, and user experience device parameters including a capability manifest of the sensory-effect hardware array 615.

In response to the beholder request, a virtual experience service 120 may construct a virtual experience container, as described in FIGS. 4A-4C. A user experience device 600, upon receiving a virtual experience container via the communications interface, renders content elements and sensory effects indicated in the virtual experience container on the sensory-effect hardware array. An experience delivery component 620 may reside on the user experience device 600 and communicate with the virtual experience service 120 to receive a virtual experience container (e.g., 150) over a network. Experience delivery component 620 may interpret the virtual experience container structured storage and display the content embedded therein in its various dimensions. Experience delivery component 620 also acts to interpret the sensory feedback meta-instructions in the sensory-effect layer of the virtual experience container. Experience delivery component 620 transforms content display, dimensional expansion, and sensory feedback meta-instructions into explicit instructions to the control software or firmware of the components of the sensory-effect hardware array 615 on specific user experience device 600, at the time when the sensory feedback is relevant to the beholder's experience.

In some embodiments, experience delivery component 620 may also have program instructions to render user interface elements that allow the beholder to control the nature of a virtual experience during the experience of it, e.g., by pausing the temporal stream of content playback, changing the perspective or point of view of the beholder (e.g., to another location, a target identity, or support persona in the content stream), and by selecting or deselecting one or more facet type, sensory-effect dimensional enhancement.

FIG. 7 shows a block diagram illustrating components of a computing device or system used in some embodiments of techniques, systems, and devices for facilitating the construction and presentation of virtual experiences of target identities in a subject matter context. Any device, system, or service present in a component environment, such as the example component environment of FIG. 1, including a virtual experience service or system (e.g., 120), user experience device (e.g., FIG. 6), supporting services such as element sources and interpretation services, as well as components and subcomponents of the aforementioned, or any other device or system herein, may be implemented on one or more systems as described with respect to system 1000.

System 1000 can be used to implement myriad computing devices, including but not limited to a personal computer, a tablet computer, a reader, a mobile device, a personal digital assistant, a wearable computer, a smartphone, a laptop computer (notebook or netbook), a gaming device or console, a desktop computer, or a smart television. Accordingly, more or fewer elements described with respect to system 1000 may be incorporated to implement any particular computing device. System 1000 can itself include one or more computing systems or devices or be distributed across multiple computing devices or sub-systems that cooperate in executing program instructions. The hardware can be configured according to any suitable computer architectures such as a Symmetric Multi-Processing (SMP) architecture or a Non-Uniform Memory Access (NUMA) architecture.

The system 1000 can include a processing system 1001, which may include a processor or processing device such as a central processing unit (CPU) or microprocessor and other circuitry that retrieves and executes software 1002 from storage system 1003. Processing system 1001 may be implemented within a single processing device but may also be distributed across multiple processing devices or sub-systems that cooperate in executing program instructions.

Examples of processing system 1001 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general-purpose CPU.

Storage system 1003 may comprise any computer-readable storage media readable by processing system 1001 and capable of storing software 1002 including, e.g., processing instructions, for facilitating the construction and presentation of virtual experiences of target identities in a subject matter context. Storage system 1003 may include volatile and nonvolatile, removable and non-removable media implemented in any method or technology for storage of information, such as computer-readable instructions, data structures, program modules, or other data.

Examples of storage media include random access memory (RAM), read only memory (ROM), magnetic disks, optical disks, solid state disks, write-once-read-many disks, CDs, DVDs, flash memory, solid state memory, phase change memory, 3D-XPoint memory, or any other suitable storage media. Certain implementations may involve either or both virtual memory and non-virtual memory. In no case do storage media consist of a transitory propagated signal. In addition to storage media, in some implementations, storage system 1003 may also include communication media over which software 1002 may be communicated internally or externally.

Storage system 1003 may be implemented as a single storage device but may also be implemented across multiple storage devices or sub-systems co-located or distributed relative to each other. Storage system 1003 may include additional elements capable of communicating with processing system 1001.

Software 1002 may be implemented in program instructions and, among other functions, may, when executed by system 1000 in general or processing system 1001 in particular, direct system 1000 or processing system 1001 to operate as described herein. Software 1002 may provide program instructions 1004 that implement components for facilitating the construction and presentation of virtual experiences of target identities in a subject matter context. Software 1002 may implement on system 1000 components, programs, agents, or layers that implement in machine-readable processing instructions 1004 the methods and techniques described herein as being performed on systems, services, or devices herein.

Application programs 1010, OS 1015 and other software may be loaded into and stored in the storage system 1003. Device operating systems 1015 generally control and coordinate the functions of the various components in the computing device, providing an easier way for applications to connect with lower level interfaces like the networking interface. Non-limiting examples of operating systems include Windows® from Microsoft Corp., IOS® from Apple, Inc., Android® OS from Google, Inc., Windows® RT from Microsoft, and different types of the Linux OS, such as Ubuntu® from Canonical or the Raspberry Pi OS. It should be noted that the OS 1015 may be implemented both natively on the computing device and on software virtualization layers running atop the native Device OS. Virtualized OS layers, while not depicted in FIG. 7, can be thought of as additional, nested groupings within the OS 1015 space, each containing an OS, application programs, and APIs.

In general, software 1002 may, when loaded into processing system 1001 and executed, transform system 1000 overall from a general-purpose computing system into a special-purpose computing system customized to facilitate the construction and presentation of virtual experiences of target identities in a subject matter context as described in various devices, systems, apparatuses, and services herein. Indeed, encoding software 1002 on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-readable storage media are characterized as primary or secondary storage. Software 1002 may also include firmware or some other form of machine-readable processing instructions executable by processing system 1001. Software 1002 may also include additional processes, programs, or components, such as operating system software and other application software.

System 1000 may represent any computing system on which software 1002 may be staged and from where software 1002 may be distributed, transported, downloaded, or otherwise provided to yet another computing system for deployment and execution, or yet additional distribution. System 1000 may also represent other computing systems that may form a necessary or optional part of an operating environment for the disclosed techniques and systems.

A communication interface 1005 may be included, providing communication connections and devices that allow for communication between system 1000 and other computing systems (not shown) over a communication network or collection of networks (not shown) or the air. Such communication connections may occur via an API between multiple systems. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here. Transmissions to and from the communications interface may be controlled by the OS 1015, which informs applications and APIs of communications events when necessary.

It should be noted that many elements of system 1000 may be included in a system-on-a-chip (SoC) device. These elements may include, but are not limited to, the processing system 1001, communications interface 1005, audio interface 1040, video interface 1045, and even elements of the storage system 1003 and software 1002.

Interface devices 1050 may include input devices such as a mouse (or track pad or other pointing device) 1051, keyboard 1052, microphone 1053, a touch device 1054 for receiving a touch gesture from a user, a motion input device 1055 for detecting non-touch gestures and other motions of users or others, and a camera 1056 for recording still and moving images. Other sensor 1057 devices and their associated processing elements, interfaces, and software/firmware support may be present that are capable of sensing or detecting environmental conditions or receiving user input, including but not limited to accelerometers, GPS sensors, temperature, wind, and humidity sensors, and ambient light and non-visible light sensors.

The interface devices 1050 may also include output devices such as display screens 1059, speakers 1060, haptic/touch devices 1061 for providing tactile, touch, or positional feedback, and other types of output devices. In certain cases, the input and output devices may be combined in a single device, such as a touchscreen display which both depicts images and receives touch gesture input from the user. Visual output may be depicted on the display 1059 in myriad ways, presenting graphical user interface elements, text, images, video, notifications, virtual buttons, virtual keyboards, or any other type of information capable of being depicted in visual form. A display 1059 can include a display mounted in a virtual reality (VR) headset or augmented reality (AR) glasses. Other kinds of user interface are possible. Interface devices 1050 may also include associated user interface software executed by the OS 1015 in support of the various user input and output devices. Such software assists the OS in communicating user interface hardware events to application programs 1010 using defined mechanisms.

Interface devices 1050 may include other I/O devices 1062 and their associated processing elements, interfaces, and software/firmware support. Other I/O devices 1062 may include devices that induce a sensory effect in or sensory feedback to a user (e.g., a beholder), such as a device that induces an olfactory or gustatory sensation in a user/beholder on a user experience device 100 as described herein (e.g., FIG. 1).

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Certain aspects of the invention provide the following non-limiting embodiments:

Example S1. A system for constructing a virtual experience of target identities to a user experience device, the system comprising: computer-readable storage media; a processing system; program instructions stored on the computer-readable storage media that, when executed by the processing system, direct the processing system to, in response to receiving a repository compilation request comprising a designator data structure for a target identity: from the repository compilation request, determine a set of element sources and query terms for a search of the set of element sources, send at least one query comprising the query terms to the set of element sources, receive search results from the search of the set of element sources, deconstruct the search results into discrete content elements classified in accordance with a schema of element facets, construct a facet-segmented repository including the discrete content elements, wherein the facet-segmented repository is associated with the designator data structure for the target identity, and store the facet-segmented repository on the computer-readable storage media.

Example S2. The system of example S1, further comprising program instructions that, when executed by the processing system, further direct the processing system to, in response to receiving, from a user experience device, a beholder request for a virtual experience, wherein the beholder request comprises a subject matter prompt, selected designators of one or more selected target identities, and user experience device parameters: determine selected discrete content elements, stored in facet-segmented repositories on the computer-readable storage media, that are associated with the selected designators of the one or more selected target identities, and that are aligned with the subject matter prompt, assemble a virtual experience container from the selected discrete content elements in accordance with the user experience device parameters, and provide the virtual experience container to the user experience device.

Example S3. The system of examples S1 or S2, wherein the program instructions to assemble the virtual experience container comprise program instructions that direct the processing system to: determine sensory-effect capabilities of the user experience device from the user experience device parameters; and modify the virtual experience container in accordance with the sensory-effect capabilities of the user experience device.

Example S4. The system of any of examples S1-S3, wherein the program instructions to modify the virtual experience container in accordance with the sensory-effect capabilities of the user experience device comprise program instructions that direct the processing system to add a sensory facet retrieved from a sensory element source to the virtual experience container.

Example S5. The system of any of examples S1-S4, wherein the program instructions to modify the virtual experience container in accordance with the sensory-effect capabilities of the user experience device comprise program instructions that direct the processing system to expand a dimension of content in the virtual experience container by one or more of: associating depth elements from a visual element source with two-dimensional visual content elements in the virtual experience container; and associating temporality progression elements with content elements in the virtual experience container.

Example S6. The system of any of examples S2-S5, wherein the program instructions that direct the processing system to determine selected discrete content elements comprise program instructions that direct the processing system to: use a trained neural network, wherein the trained neural network is trained to associate existing content patterns with various subject matter prompts, to identify selected discrete content elements in the facet-segmented repositories given an input of the subject matter prompt.

Example S7. The system of any of examples S2-S5, wherein the program instructions that direct the processing system to determine selected discrete content elements comprise program instructions that direct the processing system to execute the process flow according to FIG. 4B.

Example S8. The system of any of examples S2-S7, wherein the program instructions that direct the processing system to assemble the virtual experience container comprise program instructions that direct the processing system to execute the process flow according to FIG. 4C.

Example S9. The system of any of examples S1-S8, wherein the program instructions that direct the processing system to assemble the virtual experience container comprise program instructions that direct the processing system to modify the selected discrete content elements in accordance with beholder properties, stored on the computer-readable storage media, of a beholder associated with the beholder request.

Example S10: The system of any of examples S1-S9, further comprising program instructions that, when executed by the processing system, further direct the processing system to: analyze the facet-segmented repository associated with the target identity to determine correlated subject matter prompts from the discrete content elements; and in response to receiving, from a user experience device, a request for a virtual experience including the target identity, provide at least one suggested subject matter prompt to the user experience device from the correlated subject matter prompts.

Example S11. The system of example S10, further comprising program instructions that, when executed by the processing system, further direct the processing system to: generate a pre-compiled virtual experience container using the discrete content elements related to one or more of the correlated subject matter prompts; and in response to receiving, from a user experience device, a beholder request for a virtual experience including the target identity and having a subject matter prompt matching a particular correlated subject matter prompt, provide the pre-compiled virtual experience container for the particular correlated subject matter prompt.

Example S12. The system of any of examples S1-11, wherein the program instructions that direct the processing system to construct the facet-segmented repository comprise program instructions that direct the processing system to, iteratively: analyze the discrete content elements in the facet-segmented repository with reference to the schema of element facets; extrapolate supplemental information comprising at least one of a supplemental discrete content element, a facet type, and a facet attribute; search a supplemental set of element sources for the supplemental information; and modify the facet-segmented repository with the supplemental information.

Example S13. The system of any of examples S1-S12, wherein the set of element sources comprises one or more of: sensor data of the target identity recorded by a third-party device; content from a chatbot interaction with the target identity; a digital inventory of possessions of the target identity; beholder-submitted content relating to the target identity; a previously-stored facet-segmented repository of the target identity; a third-party facet-segmented repository; a genealogy database; and content from a DNA analysis of the target identity.

Example S14. The system of any of examples S1-S13, wherein the schema of element facets comprises one or more of: a primary concept facet type, a place facet type, a temporal facet type, an environment facet type, a person identity facet type, an emotion facet type, a sentiment facet type, a personality trait facet type, a supplemental concept facet type, a sensory facet type, and a cultural facet type.

Example S15. The system of any of examples S2-S14, wherein the virtual experience container has the structural arrangement according to FIG. 5.

Example S16. The system of any of examples S2-S15, wherein the virtual experience container has multiple optional paths in the direction of flow.

Example S17. The system of example S16, wherein the direction of flow among the multiple optional paths in the virtual experience container is determined interactively with the beholder.

Example S18. The system of any of examples S1-S17, wherein the facet-segmented repository is stored in a RDBMS.

Example S19. The system of any of examples S1-17, wherein the facet-segmented repository is stored in a NoSQL database.

Example S20. The system of any of examples S1-S19, wherein the facet-segmented repository is stored in the form of Extended Markup Language (XML) in one or more repositories.

Example S21: The system of any of examples S1-S20, wherein the schema of element facets is defined using XML Schemas.

Example S22. The system of any of examples S1-S21, wherein the repository compilation request further comprises a topical limiter.

Example S23. The system of any of examples S1-S22, wherein the repository compilation request comprises content uploaded by a beholder.

Example S24. The system of any of examples S1-S23, wherein the repository compilation request comprises access credentials to content in a beholder-controlled repository.

Example S25. The system of any of examples S2-S24, wherein the subject matter prompt comprises one or more of: a descriptor of an actual event; a description of a memory; a description of a life experience; a topic of conversation; a gesture, wherein the gesture is indicated through a sensor of the user experience device, or wherein the gesture is indicated by a recorded gesture submitted in the beholder request; a description of a hypothetical situation; and a fictional event.

Example S26. The system of any of examples S2-S25, wherein the beholder request comprises content uploaded by a beholder.

Example S27. The system of any of examples S2-S26, wherein the beholder request comprises access credentials to content in a beholder-controlled repository.

Example S28. The system of any of examples S2-S27, wherein the beholder request is jointly constructed by more than one beholder.

Example S29: The system of any of examples S2-S28, wherein the user experience device parameters comprise beholder experience delivery preferences.

Example D1. A user experience device for selecting and rendering a virtual experience of target identities, the device comprising: a communications interface; a processing system; a user interface system; a sensory-effect hardware array; computer-readable storage media; program instructions on the computer-readable storage media that, when executed by the processing system, direct the processing system to: upon receiving an indication via the user interface system, send, via the communications interface, a beholder request comprising a subject matter prompt, selected designators of one or more selected identities, and user experience device parameters including a capability manifest of the sensory-effect hardware array; upon receiving a virtual experience container via the communications interface, render content elements and sensory effects indicated in the virtual experience container on the sensory-effect hardware array.

Example D2. The user experience device of example D1, further comprising program instructions that, when executed by the processing system, further direct the processing system to: render, via the user interface system, a user interface comprising selectable artifacts arrayed in an anchor setting associated with a beholder account, wherein indicating a selected digital artifact generates the indication and the subject matter prompt for the beholder request.

Example D3. The user experience device of example D1 or D2, further comprising program instructions that, when executed by the processing system, further direct the processing system to: render, via the user interface system, a timescale selector for indicating a beholder preference for a timescale of the virtual experience container, wherein indicating the beholder preference for the timescale includes the beholder preference in the beholder request.

Example D4. The user experience device of any of examples D1-D3, further comprising program instructions that, when executed by the processing system, further direct the processing system to render, via the user interface system, one or more of: a selector for indicating the perspective or point of view of the beholder; and an indicator for selecting/deselecting one or more facet type.

Example D5. The user experience device of any of examples D1-D4, wherein the sensory-effect hardware array comprises components for sensory expansion including at least one of touch feedback components, gustatory components, and olfactory components.

Example D6. The user experience device of any of examples D1-D5, wherein the sensory-effect hardware array comprises virtual reality components.

Example D7. The user experience device of any of examples D1-D6, wherein the sensory-effect hardware array comprises components for depicting lesser-dimensional content as higher-dimensional content.

Example D8. The user experience device of example D7, wherein the components for depicting lesser-dimensional content as higher-dimensional content comprise a three-dimensional free-space volumetric display.

Example D9. The user experience device of any of examples D1-D8, wherein the sensory-effect hardware array comprises components including a sensorium room.

Example D10. The user experience device of any of examples D1-D9, wherein the user experience device has the components described with respect to FIG. 6.

Example D11. The user experience device of any of examples D1-D10, wherein the program instructions are separated between a beholder request component and an experience delivery component.

Example D12. The user experience device of example D11, wherein the beholder request component and the experience delivery component are present on separate physical computing devices.

Example D13. The user experience device of any of examples D1-D12, wherein the user experience device is a mobile computing device.

Example D14. The user experience device of any of examples D1-D13, wherein the beholder request is sent to the system of any of examples S1-S29.

Example D15. The user experience device of any of examples D1-D14, wherein the virtual experience container is received from the system of any of examples S1-S29.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

Certain features that are described in this disclosure in the context of separate embodiments can also be implemented in combination in a single embodiment. Conversely, various features that are described in the context of a single embodiment can be implemented in multiple embodiments separately or in various suitable sub-combinations. Also, features described in connection with one combination can be excised from that combination and can be combined with other features in various combinations and sub-combinations. Various features can be added to the example embodiments disclosed herein. Also, various features can be omitted from the example embodiments disclosed herein.

Similarly, while operations are depicted in the drawings or described in a particular order, the operations can be performed in a different order than shown or described. Other operations not depicted can be incorporated before, after, or simultaneously with the operations shown or described. In certain circumstances, parallel processing or multitasking can be used. Also, in some cases, the operations shown or discussed can be omitted or recombined to form various combinations and sub-combinations.

What is claimed is:

1. A system for constructing a virtual experience of target identities to a user experience device, the system comprising:
    computer-readable storage media;
    a processing system;
    program instructions stored on the computer-readable storage media that, when executed by the processing system, direct the processing system to:
    in response to receiving a repository compilation request comprising a designator data structure for a target identity:
        from the repository compilation request, determine a set of element sources and query terms for a search of the set of element sources,
        send at least one query comprising the query terms to the set of element sources,
        receive search results from the search of the set of element sources,
        deconstruct the search results into discrete content elements classified in accordance with a schema of element facets,
        construct a facet-segmented repository including the discrete content elements, wherein the facet-segmented repository is associated with the designator data structure for the target identity, and
        store the facet-segmented repository on the computer-readable storage media.

2. The system of claim 1, wherein the repository compilation request further comprises a topical limiter.

3. The system of claim 1, further comprising program instructions that, when executed by the processing system, further direct the processing system to:
    in response to receiving, from a user experience device, a beholder request for a virtual experience, wherein the beholder request comprises a subject matter prompt, selected designators of one or more selected target identities, and user experience device parameters:
        determine selected discrete content elements, stored in facet-segmented repositories on the computer-readable storage media, that are associated with the selected designators of the one or more selected target identities, and that are aligned with the subject matter prompt,
        assemble a virtual experience container from the selected discrete content elements in accordance with the user experience device parameters, and
        provide the virtual experience container to the user experience device.

4. The system of claim 3, wherein the subject matter prompt comprises one or more of:
    a descriptor of an actual event;
    a description of a memory;
    a description of a life experience;
    a topic of conversation;
    a gesture, wherein the gesture is indicated through a sensor of the user experience device, or wherein the gesture is indicated by a recorded gesture submitted in the beholder request;
    a description of a hypothetical situation; and
    a fictional event.

5. The system of claim 3, wherein the program instructions to assemble the virtual experience container comprise program instructions that direct the processing system to:
    determine sensory-effect capabilities of the user experience device from the user experience device parameters; and
    modify the virtual experience container in accordance with the sensory-effect capabilities of the user experience device.

6. The system of claim 5, wherein the program instructions to modify the virtual experience container in accordance with the sensory-effect capabilities of the user experience device comprise program instructions that direct the processing system to add a sensory facet retrieved from a sensory element source to the virtual experience container.

7. The system of claim 5, wherein the program instructions to modify the virtual experience container in accordance with the sensory-effect capabilities of the user experience device comprise program instructions that direct the processing system to expand a dimension of content in the virtual experience container by one or more of:
    associating depth elements from a visual element source with two-dimensional visual content elements in the virtual experience container; and
    associating temporality progression elements with content elements in the virtual experience container.

8. The system of claim 3, wherein the program instructions that direct the processing system to assemble the virtual experience container comprise program instructions that direct the processing system to modify the selected discrete content elements in accordance with beholder properties, stored on the computer-readable storage media, of a beholder associated with the beholder request.

9. The system of claim 3, wherein the program instructions that direct the processing system to determine selected discrete content elements comprise program instructions that direct the processing system to:
    use a trained neural network, wherein the trained neural network is trained to associate existing content patterns with various subject matter prompts, to identify selected discrete content elements in the facet-segmented repositories given an input of the subject matter prompt.

10. The system of claim 1, further comprising program instructions that, when executed by the processing system, further direct the processing system to:
    analyze the facet-segmented repository associated with the target identity to determine correlated subject matter prompts from the discrete content elements; and in response to receiving, from a user experience device, a request for a virtual experience including the target identity, provide at least one suggested subject matter prompt to the user experience device from the correlated subject matter prompts.

11. The system of claim 10, further comprising program instructions that, when executed by the processing system, further direct the processing system to:
generate a pre-compiled virtual experience container using the discrete content elements related to one or more of the correlated subject matter prompts; and
in response to receiving, from a user experience device, a beholder request for a virtual experience including the target identity and having a subject matter prompt matching a particular correlated subject matter prompt, provide the pre-compiled virtual experience container for the particular correlated subject matter prompt.

12. The system of claim 1, wherein the schema of element facets comprises one or more of: a primary concept facet type, a place facet type, a temporal facet type, an environment facet type, a person identity facet type, an emotion facet type, a sentiment facet type, a personality trait facet type, a supplemental concept facet type, a sensory facet type, and a cultural facet type.

13. The system of claim 1, wherein the set of element sources comprises one or more of:
sensor data of the target identity recorded by a third-party device;
content from a chatbot interaction with the target identity;
a digital inventory of possessions of the target identity;
beholder-submitted content relating to the target identity;
a previously-stored facet-segmented repository of the target identity;
a third-party facet-segmented repository;
a genealogy database; and
content from a DNA analysis of the target identity.

14. The system of claim 1, wherein the program instructions that direct the processing system to construct the facet-segmented repository comprise program instructions that direct the processing system to, iteratively:
analyze the discrete content elements in the facet-segmented repository with reference to the schema of element facets;
extrapolate supplemental information comprising at least one of a supplemental discrete content element, a facet type, and a facet attribute;
search a supplemental set of element sources for the supplemental information; and
modify the facet-segmented repository with the supplemental information.

\* \* \* \* \*